US011357370B2

(12) United States Patent
Bohlen et al.

(10) Patent No.: US 11,357,370 B2
(45) Date of Patent: Jun. 14, 2022

(54) HANDHELD VACUUM CLEANER

(71) Applicant: Techtronic Industries Co. Ltd., Tsuen Wan (HK)

(72) Inventors: John Bohlen, Solon, OH (US); Richard Friend, Streetsboro, OH (US); Joseph Saunders, Wadsworth, OH (US); Sergey V. Makarov, Solon, OH (US); Kirti Kant Paulla, Cuyahoga Falls, OH (US)

(73) Assignee: Techtronic Industries Co. Ltd., Kwai Chung (HK)

( * ) Notice: Subject to any disclaimer, the term of this patent is extended or adjusted under 35 U.S.C. 154(b) by 75 days.

(21) Appl. No.: 16/600,187

(22) Filed: Oct. 11, 2019

(65) Prior Publication Data

US 2020/0037835 A1 Feb. 6, 2020

Related U.S. Application Data

(63) Continuation of application No. 15/775,146, filed as application No. PCT/US2016/061293 on Nov. 10, 2016, now Pat. No. 10,786,126.

(Continued)

(51) Int. Cl.
*A47L 5/24* (2006.01)
*A47L 9/16* (2006.01)
(Continued)

(52) U.S. Cl.
CPC ............... *A47L 5/24* (2013.01); *A47L 9/127* (2013.01); *A47L 9/16* (2013.01); *A47L 9/1608* (2013.01);
(Continued)

(58) Field of Classification Search
CPC ... A47L 5/24; A47L 9/127; A47L 9/16; A47L 9/1608; A47L 9/1683; A47L 5/28;
(Continued)

(56) References Cited

U.S. PATENT DOCUMENTS 3,204,395 A 9/1965 Howard
3,320,727 A 5/1967 Farley et al.
(Continued)

FOREIGN PATENT DOCUMENTS

CA 2658497 9/2019
CN 2899953 Y 5/2007
(Continued)

OTHER PUBLICATIONS

International Search Report issued in International Application No. PCT/US2016/061293, dated Feb. 22, 2017.
(Continued)

*Primary Examiner* — Robert J Scruggs
(74) *Attorney, Agent, or Firm* — Michael Best & Friedrich LLP

(57) ABSTRACT

A handheld vacuum cleaner including a fluid flow path, a main body, a fluid flow motor, a battery, and a cyclone chamber. The fluid flow path extends from a dirty air inlet to a clean air outlet, and the main body includes a handle. The fluid flow motor is positioned in the fluid flow path. The battery is positioned below the fluid flow motor. The cyclone chamber is in the fluid flow path transverse to the dirty air inlet. The cyclone chamber includes a first end wall and a second end wall, a cyclone chamber axis passing through the first end wall and the second end wall, a cyclone dirty fluid inlet, and a cyclone clean fluid outlet. The first end wall and the second end wall of the cyclone chamber both intersect a common horizontal plane when the handheld vacuum cleaner is positioned on a horizontal surface.

28 Claims, 21 Drawing Sheets

Related U.S. Application Data

(60) Provisional application No. 62/253,508, filed on Nov. 10, 2015.

(51) Int. Cl.
| | |
|---|---|
| *A47L 9/12* | (2006.01) |
| *B01D 46/64* | (2022.01) |
| *B01D 50/20* | (2022.01) |
| *B01D 45/16* | (2006.01) |
| *B01D 46/00* | (2022.01) |
| *B01D 46/24* | (2006.01) |
| *B04C 5/103* | (2006.01) |
| *B04C 5/12* | (2006.01) |
| *B04C 9/00* | (2006.01) |

(52) U.S. Cl.
CPC ............ *A47L 9/1683* (2013.01); *B01D 45/16* (2013.01); *B01D 46/0004* (2013.01); *B01D 46/2403* (2013.01); *B01D 46/64* (2022.01); *B01D 50/20* (2022.01); *B04C 5/103* (2013.01); *B04C 5/12* (2013.01); *B04C 9/00* (2013.01); *B01D 2279/55* (2013.01); *B04C 2009/002* (2013.01)

(58) Field of Classification Search
CPC ..... A47L 9/1666; A47L 9/1691; B01D 45/16; B01D 46/0004; B01D 46/0024; B01D 46/2403; B01D 50/002; B01D 2279/55; B04C 5/103; B04C 5/12; B04C 9/00; B04C 2009/002

See application file for complete search history.

(56) References Cited

U.S. PATENT DOCUMENTS

| | | | |
|---|---|---|---|
| 3,871,847 A | 3/1975 | Fish | |
| 4,072,483 A | 2/1978 | Doyle, Jr. | |
| 4,894,881 A | 1/1990 | Palmer et al. | |
| 4,945,604 A * | 8/1990 | Miner | A47L 5/14 15/344 |
| 5,035,024 A * | 7/1991 | Steiner | A47L 7/0009 15/339 |
| 5,089,738 A * | 2/1992 | Bergqvist | B25F 5/02 310/50 |
| 5,096,472 A | 3/1992 | Perry | |
| 5,174,799 A | 12/1992 | Garcia-Mallol | |
| 5,248,323 A * | 9/1993 | Stevenson | A47L 9/125 55/337 |
| RE34,980 E | 7/1995 | Rau et al. | |
| 5,819,955 A | 10/1998 | Clarke | |
| 6,108,864 A | 8/2000 | Thomas et al. | |
| 6,158,083 A | 12/2000 | Holston | |
| 6,171,356 B1 | 1/2001 | Twerdum | |
| 6,289,553 B1 | 9/2001 | Dyson | |
| 6,398,834 B2 | 6/2002 | Oh | |
| 6,406,505 B1 | 6/2002 | Oh et al. | |
| 6,432,154 B2 | 8/2002 | Oh et al. | |
| 6,434,785 B1 * | 8/2002 | Vandenbelt | A47L 5/24 15/344 |
| 6,625,845 B2 | 9/2003 | Matsumoto et al. | |
| 6,658,833 B2 | 12/2003 | Dunning et al. | |
| 6,709,495 B1 | 3/2004 | Storer | |
| 6,824,580 B2 | 11/2004 | Oh | |
| 6,840,972 B1 | 1/2005 | Kim | |
| 6,904,742 B2 | 6/2005 | Dunning et al. | |
| 6,991,667 B2 | 1/2006 | Yang et al. | |
| 7,070,636 B2 | 7/2006 | McCormick et al. | |
| 7,097,680 B2 | 8/2006 | Oh | |
| 7,114,317 B2 | 10/2006 | Dunning et al. | |
| 7,152,276 B2 | 12/2006 | Jin et al. | |
| 7,169,201 B2 | 1/2007 | Oh | |
| 7,273,506 B2 | 9/2007 | Oh | |
| 7,294,159 B2 | 11/2007 | Oh | |
| 7,329,297 B2 | 2/2008 | Dunning et al. | |
| 7,351,269 B2 | 4/2008 | Yau | |
| 7,354,466 B2 | 4/2008 | Dunning et al. | |
| 7,361,200 B2 | 4/2008 | Oh et al. | |
| 7,404,231 B2 | 7/2008 | Kang | |
| 7,410,535 B2 | 8/2008 | Song et al. | |
| 7,419,520 B2 | 9/2008 | Lee et al. | |
| 7,494,520 B2 | 2/2009 | Nam et al. | |
| 7,537,625 B2 | 5/2009 | Han et al. | |
| 7,601,188 B2 | 10/2009 | Hwang et al. | |
| 7,632,324 B2 | 12/2009 | Makarov | |
| 7,662,198 B2 | 2/2010 | Jansen et al. | |
| 7,678,166 B2 | 3/2010 | Yoo et al. | |
| 7,708,789 B2 | 5/2010 | Fester | |
| 7,722,693 B2 | 5/2010 | Yoo et al. | |
| 7,744,667 B2 | 6/2010 | Oh et al. | |
| 7,749,296 B2 | 7/2010 | Han et al. | |
| 7,762,052 B2 | 7/2010 | Dunning et al. | |
| 7,770,256 B1 | 8/2010 | Fester | |
| 7,776,116 B2 | 8/2010 | Oh et al. | |
| 7,776,121 B2 | 8/2010 | Yun et al. | |
| 7,799,103 B2 | 9/2010 | Coburn | |
| 7,837,751 B2 | 11/2010 | Dunning et al. | |
| 7,845,046 B2 | 12/2010 | Milligan et al. | |
| 7,941,895 B2 | 5/2011 | Conrad | |
| 7,996,957 B2 | 8/2011 | Kah, Jr. | |
| 8,028,373 B2 | 10/2011 | Rowntree | |
| 8,034,140 B2 | 10/2011 | Conrad | |
| 8,051,531 B2 | 11/2011 | Brough | |
| 8,112,842 B2 | 2/2012 | Courtney | |
| 8,117,712 B2 | 2/2012 | Dyson et al. | |
| 8,166,607 B2 | 5/2012 | Conrad | |
| 8,192,515 B2 | 6/2012 | Conrad | |
| 8,250,702 B2 | 8/2012 | Conrad | |
| 8,308,831 B2 | 11/2012 | Coburn | |
| 8,387,204 B2 * | 3/2013 | Dyson | A47L 9/2884 15/344 |
| 8,398,734 B2 | 3/2013 | Willink | |
| 8,438,700 B2 | 5/2013 | Makarov | |
| 8,495,788 B2 | 7/2013 | Tran | |
| 8,510,907 B2 | 8/2013 | Conrad | |
| 8,549,704 B2 | 10/2013 | Milligan et al. | |
| 8,607,407 B2 | 12/2013 | Conrad | |
| 8,640,303 B2 | 2/2014 | Conrad | |
| 8,726,461 B2 | 5/2014 | Makarov et al. | |
| 8,869,344 B2 * | 10/2014 | Conrad | A47L 9/1608 15/353 |
| 8,898,857 B2 | 12/2014 | Conrad | |
| 8,978,198 B2 | 3/2015 | Conrad | |
| 9,009,912 B2 | 4/2015 | Conrad | |
| 9,492,045 B2 | 11/2016 | Conrad | |
| 10,105,022 B2 | 10/2018 | Lim et al. | |
| 10,159,391 B2 | 12/2018 | Brown et al. | |
| 10,258,209 B2 | 4/2019 | Song et al. | |
| 10,307,026 B2 | 6/2019 | Zhong et al. | |
| 2002/0011052 A1 | 1/2002 | Oh et al. | |
| 2002/0011053 A1 | 1/2002 | Oh | |
| 2002/0092129 A1 | 7/2002 | Stephens et al. | |
| 2003/0159235 A1 | 8/2003 | Oh | |
| 2005/0050678 A1 | 3/2005 | Oh et al. | |
| 2005/0050863 A1 | 3/2005 | Oh | |
| 2005/0050864 A1 | 3/2005 | Oh et al. | |
| 2005/0050865 A1 | 3/2005 | Oh | |
| 2005/0217067 A1 | 10/2005 | Rew et al. | |
| 2005/0251951 A1 | 11/2005 | Oh et al. | |
| 2006/0090290 A1 | 5/2006 | Lau | |
| 2006/0230725 A1 | 10/2006 | Han et al. | |
| 2007/0022563 A1 * | 2/2007 | Wu | A47L 5/24 15/344 |
| 2007/0039127 A1 | 2/2007 | Kang | |
| 2007/0056136 A1 | 3/2007 | Stephens et al. | |
| 2007/0095034 A1 | 5/2007 | Han et al. | |
| 2007/0119129 A1 | 5/2007 | Jeon | |
| 2007/0199284 A1 | 8/2007 | Yoo et al. | |
| 2007/0266678 A1 | 11/2007 | Makarov et al. | |
| 2007/0271724 A1 | 11/2007 | Hakan et al. | |
| 2007/0271725 A1 | 11/2007 | Han et al. | |
| 2008/0010957 A1 | 1/2008 | Yun et al. | |

(56) References Cited

U.S. PATENT DOCUMENTS

| | | | |
|---|---|---|---|
| 2008/0040883 A1* | 2/2008 | Beskow | A47L 9/165 15/329 |
| 2008/0178418 A1 | 7/2008 | Conrad | |
| 2008/0178420 A1 | 7/2008 | Conrad | |
| 2008/0184681 A1 | 8/2008 | Oh et al. | |
| 2008/0196196 A1 | 8/2008 | Conrad | |
| 2008/0196366 A1 | 8/2008 | Conrad | |
| 2008/0256911 A1 | 10/2008 | Oh et al. | |
| 2008/0289139 A1 | 11/2008 | Makarov et al. | |
| 2009/0031525 A1 | 2/2009 | Makarov et al. | |
| 2009/0133370 A1 | 5/2009 | Yoo et al. | |
| 2009/0173365 A1 | 7/2009 | Conrad | |
| 2009/0181841 A1 | 7/2009 | Conrad | |
| 2009/0205160 A1 | 8/2009 | Conrad | |
| 2009/0205161 A1 | 8/2009 | Conrad | |
| 2009/0209403 A1 | 8/2009 | Conrad | |
| 2009/0299865 A1 | 12/2009 | Budgen | |
| 2009/0307864 A1 | 12/2009 | Dyson | |
| 2009/0313783 A1 | 12/2009 | Nakano et al. | |
| 2010/0229323 A1 | 9/2010 | Conrad | |
| 2010/0229325 A1 | 9/2010 | Conrad | |
| 2011/0219576 A1 | 9/2011 | Conrad | |
| 2011/0219577 A1 | 9/2011 | Conrad | |
| 2011/0237757 A1 | 9/2011 | East et al. | |
| 2011/0296648 A1 | 12/2011 | Kah, Jr. | |
| 2012/0216368 A1 | 8/2012 | Maeda et al. | |
| 2012/0311814 A1 | 12/2012 | Kah, Jr. | |
| 2013/0061568 A1 | 3/2013 | Conrad | |
| 2013/0086877 A1* | 4/2013 | Kori | B01D 46/0024 55/482 |
| 2013/0091810 A1 | 4/2013 | Smith | |
| 2013/0145574 A1 | 6/2013 | Makarov et al. | |
| 2013/0145575 A1 | 6/2013 | Conrad | |
| 2013/0232722 A1 | 9/2013 | Conrad | |
| 2014/0075712 A1 | 3/2014 | Robertson et al. | |
| 2014/0109532 A1 | 4/2014 | Kaufmann et al. | |
| 2014/0137364 A1* | 5/2014 | Stickney | A47L 9/1683 15/347 |
| 2014/0237757 A1 | 8/2014 | Conrad | |
| 2014/0237758 A1 | 8/2014 | Conrad | |
| 2014/0259513 A1 | 9/2014 | Conrad et al. | |
| 2014/0259518 A1 | 9/2014 | Conrad et al. | |
| 2014/0259519 A1 | 9/2014 | Conrad et al. | |
| 2014/0283332 A1 | 9/2014 | Conrad et al. | |
| 2014/0298610 A1 | 10/2014 | Tiekoetter et al. | |
| 2014/0373307 A1 | 12/2014 | Van Der Kooi | |
| 2015/0121651 A1 | 5/2015 | Conrad | |
| 2016/0113455 A1* | 4/2016 | Horvath | A47L 5/24 15/344 |
| 2016/0128527 A1* | 5/2016 | Grey | A47L 5/24 15/344 |
| 2016/0150923 A1 | 6/2016 | Conrad | |
| 2016/0174799 A1 | 6/2016 | Thorne et al. | |
| 2016/0213211 A1 | 7/2016 | Conrad | |
| 2017/0071426 A1 | 3/2017 | Krebs et al. | |
| 2018/0000295 A1 | 1/2018 | Song et al. | |
| 2018/0132687 A1 | 5/2018 | Reeves et al. | |
| 2018/0132688 A1 | 5/2018 | Walker | |
| 2018/0177366 A1 | 6/2018 | Conrad | |
| 2018/0289227 A1 | 10/2018 | Takano et al. | |
| 2018/0296047 A1 | 10/2018 | Ni | |
| 2019/0090701 A1 | 3/2019 | Tonderys et al. | |
| 2019/0183307 A1 | 6/2019 | Irfan et al. | |
| 2019/0200824 A1 | 7/2019 | Campbell-Hill | |
| 2019/0200830 A1 | 7/2019 | Crouch et al. | |
| 2019/0216280 A1 | 7/2019 | Conrad | |

FOREIGN PATENT DOCUMENTS

| | | |
|---|---|---|
| CN | 101277637 A | 10/2008 |
| CN | 101385627 A | 3/2009 |
| CN | 101675872 A | 3/2010 |
| CN | 201469187 U | 5/2010 |
| CN | 101940454 A | 1/2011 |
| CN | 101991390 A | 3/2011 |
| CN | 101992152 A | 3/2011 |
| CN | 101999865 A | 4/2011 |
| CN | 101999867 A | 4/2011 |
| CN | 102652652 A | 9/2012 |
| CN | 102670132 A | 9/2012 |
| CN | 102858218 A | 1/2013 |
| CN | 103040407 A | 4/2013 |
| CN | 103181741 A | 7/2013 |
| CN | 203539240 U | 4/2014 |
| CN | 104172986 A | 12/2014 |
| CN | 104433964 A | 3/2015 |
| CN | 106388698 A | 2/2017 |
| CN | 206063055 U | 4/2017 |
| CN | 107198491 A | 9/2017 |
| CN | 206507889 U | 9/2017 |
| CN | 107280580 A | 10/2017 |
| CN | 206576819 U | 10/2017 |
| DE | 202012101457 U1 | 6/2012 |
| DE | 102009009324 B4 | 4/2013 |
| DE | 102012100050 A1 | 7/2013 |
| DE | 102012102888 A1 | 10/2013 |
| DE | 102016107602 A | 10/2017 |
| EP | 1323370 A2 | 7/2003 |
| EP | 1457150 A2 | 9/2004 |
| EP | 1523916 * | 4/2005 |
| EP | 1656872 A2 | 5/2006 |
| EP | 2191761 A1 | 6/2010 |
| EP | 2 581 017 A1 | 4/2013 |
| EP | 1692991 B1 | 6/2014 |
| EP | 2 540 206 B1 | 3/2015 |
| FR | 2736532 A1 | 1/1997 |
| FR | 2844174 A1 | 3/2004 |
| FR | 2882912 B1 | 6/2007 |
| JP | 55570227 A | 5/1980 |
| JP | 2002223997 A | 8/2002 |
| JP | 2003135332 A | 5/2003 |
| JP | 2003319896 A | 11/2003 |
| JP | 2004049783 A | 2/2004 |
| JP | 2004121622 A | 4/2004 |
| JP | 2006006453 A | 1/2006 |
| JP | 2014018300 A | 2/2014 |
| JP | 2016043142 A | 4/2016 |
| JP | 2016154706 A | 9/2016 |
| JP | 2017006240 A | 1/2017 |
| JP | 2017018449 A | 1/2017 |
| KR | 20060008645 A | 1/2006 |
| KR | 818225 B1 | 4/2008 |
| KR | 20100018782 A | 2/2010 |
| KR | 20120054223 A | 5/2012 |
| KR | 20120074449 A | 7/2012 |
| KR | 101474903 B1 | 12/2014 |
| WO | 2002039867 A1 | 5/2002 |
| WO | 2007039327 A1 | 4/2007 |
| WO | 2007104238 A1 | 9/2007 |
| WO | 2010102399 A1 | 9/2010 |
| WO | 2012059667 A2 | 5/2012 |
| WO | 2017147643 A1 | 9/2017 |
| WO | 2017181484 A1 | 10/2017 |
| WO | 2018128371 A1 | 7/2018 |

OTHER PUBLICATIONS

Shark, "ION Rocket IR100 Series", User Manual, 2017, 13 pages.
Panasonic, "Vacuum Cleaner (Household) MC-CG901", Operating Instructions, 2010, 60 pages.
Dyson, "Operating Manual DC40", User Guide, 2012, 16 pages.
Dyson, "Operating Manual DC22", User Guide, 2009, 16 pages.
Bissell, "Powerlifter Vacuum 1309 Series", User Guide, 2015, 24 pages.
Bissell, "Clean View Power Trak Bagless Revolution", User's Guide, 16 pages.
Bissell, "Cleanview" User Guide, 2013, 16 pages.
Bissell, "Total Floors Multi Surface Multi Cyclonic COMPLETE", User's Guide, 2012, 20 pages.
Miele, "Canister Vacuum Cleaner" Operating Instructions, 2017, 32 pages.

(56) References Cited

OTHER PUBLICATIONS

Dirt Devil, "Power Stick Cyclonic Vacuum", User Manual, 2016, 48 pages.
Shark, "IONFLEX with DuoClean IF200 IF250 Series", User Manual, 2017, 13 pages.
Shark, "ION Rocket IR70 Series", User Manual, 2017, 13 pages.
Chinese Patent Office Action for Application No. 201680078530.5 dated Mar. 19, 2020 (9 pages including statement of relevance).
United States Patent Office Non-final Office Action for U.S. Appl. No. 16/787,714 dated Nov. 30, 2021 (13 pages).

* cited by examiner

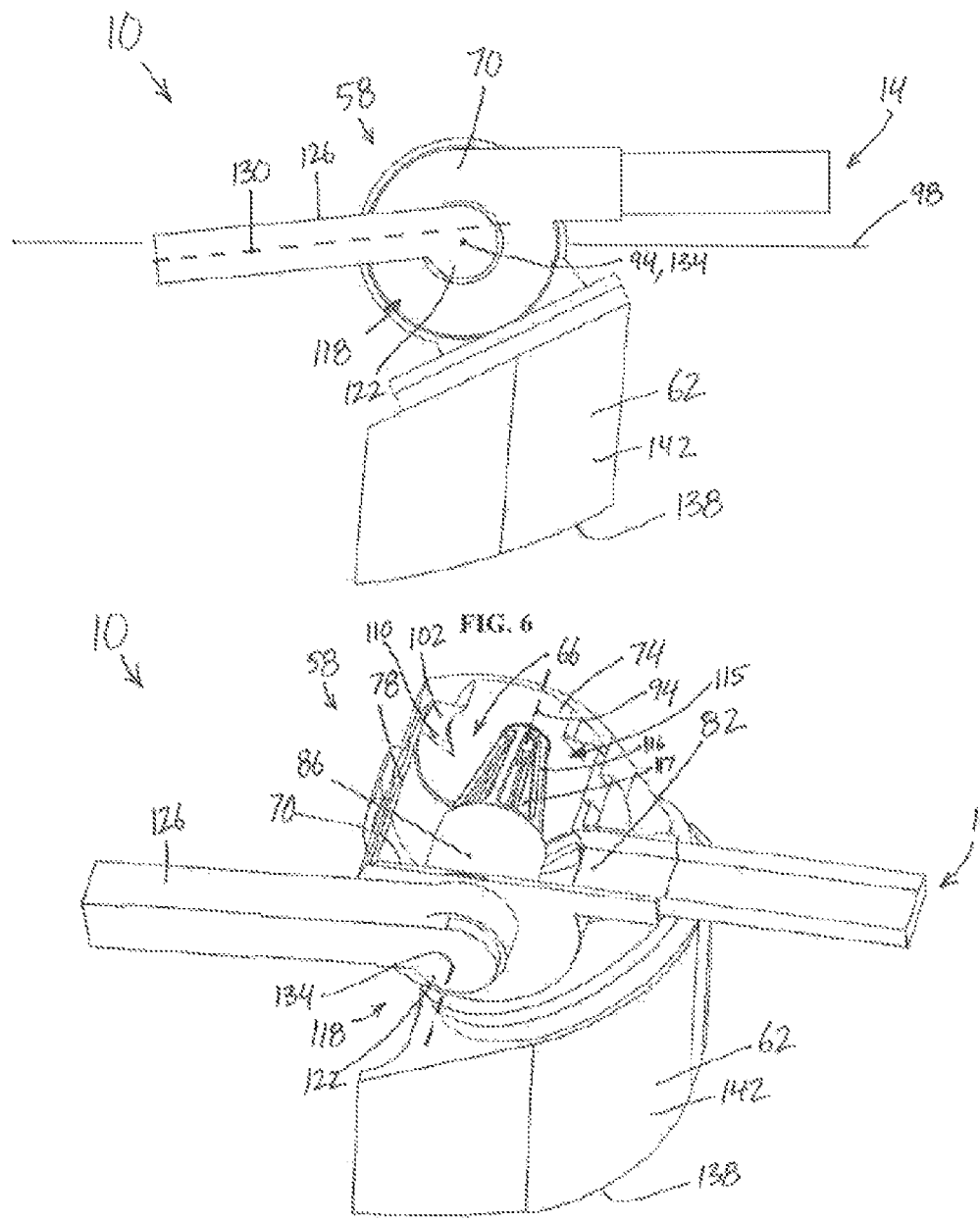

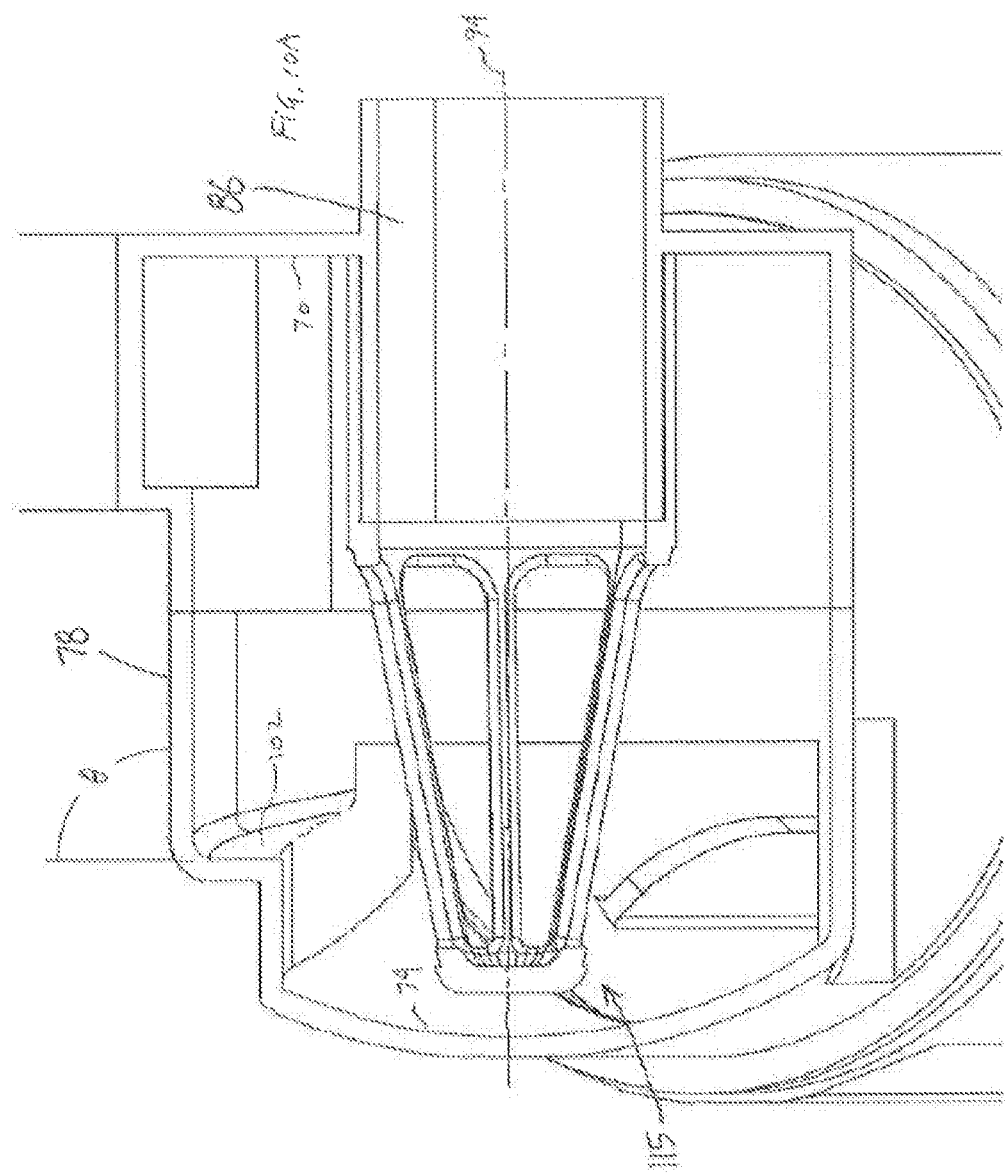

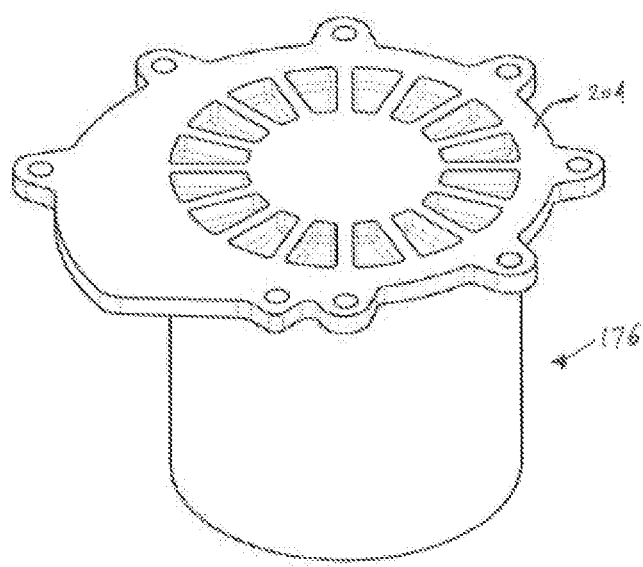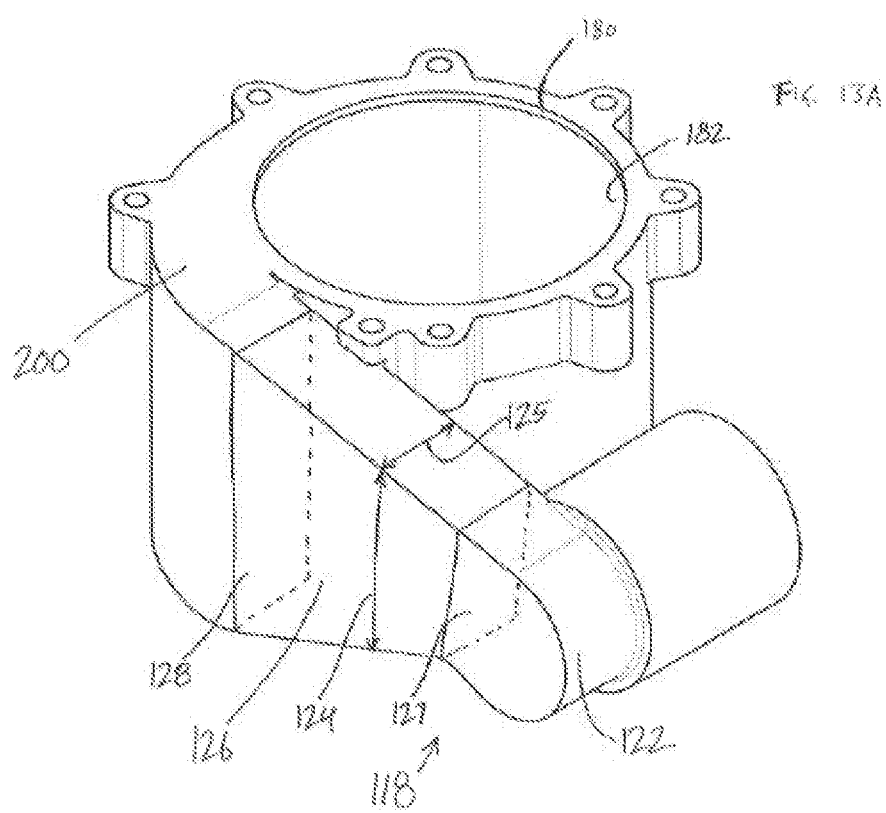
FIG. 13A

HANDHELD VACUUM CLEANER

CROSS-REFERENCE TO RELATED APPLICATIONS

This application is a continuation application of U.S. patent application Ser. No. 15/775,146, filed on May 10, 2018, which is a 371 of PCT/US16/61293, filed on Nov. 10, 2016, which claims priority to U.S. Provisional Patent Application No. 62/253,508, filed on Nov. 10, 2015, the entire contents of each of these applications is incorporated herein by reference.

BACKGROUND

The present invention relates to handheld vacuum cleaners, and more particularly, to cyclonic handheld vacuum cleaners.

SUMMARY

In one embodiment, the invention provides a handheld vacuum cleaner including a fluid flow path, a main body, a fluid flow motor, a battery, and a cyclone chamber. The fluid flow path extends from a dirty air inlet to a clean air outlet, and the main body includes a handle. The fluid flow motor is positioned in the fluid flow path. The battery is positioned below the fluid flow motor. The cyclone chamber is in the fluid flow path transverse to the dirty air inlet. The cyclone chamber includes a first end wall and a second end wall, a cyclone chamber axis passing through the first end wall and the second end wall, a cyclone dirty fluid inlet, and a cyclone clean fluid outlet. The first end wall and the second end wall of the cyclone chamber both intersect a common horizontal plane when the handheld vacuum cleaner is positioned on a horizontal surface.

In another embodiment, the invention provides a handheld vacuum cleaner including a fluid flow path, a main body, a fluid flow motor, and a cyclone chamber in the fluid flow path. The fluid flow path extends from a dirty air inlet to a clean air outlet, and the main body includes a handle. The fluid flow motor is positioned in the fluid flow path and has a fluid flow motor axis that is vertical when the handheld vacuum cleaner is positioned on a horizontal surface. The cyclonic chamber includes a first end wall and a second end wall, a cyclone chamber axis passing through the first end wall and the second end wall, a cyclone dirty fluid inlet, and a cyclone clean fluid outlet. The first end wall and the second end wall of the cyclone chamber both intersect a common horizontal plane when the handheld vacuum cleaner is positioned on the horizontal surface.

In another embodiment, the invention provides a handheld vacuum cleaner including a fluid flow path, a main body, a fluid flow motor, a dirt collection region, and a cyclone chamber in the fluid flow path. The fluid flow path extends from a dirty air inlet to a clean air outlet, and the main body includes a handle. The fluid flow motor is positioned in the fluid flow path. The dirt collection region includes an openable bottom. The fluid flow motor is positioned between the dirt collection region and the handle. The cyclone chamber includes a first end wall and a second end wall, a cyclone dirty fluid inlet, and a cyclone clean fluid outlet. The first end wall and the second end wall of the cyclone chamber both intersect a common horizontal plane when the handheld vacuum cleaner is positioned on a horizontal surface.

In another embodiment, the invention provides a vacuum cleaner including a fluid flow path extending from a dirty air inlet to a clean air outlet, a main body including a handle, and a fluid flow motor positioned in the fluid flow path. The vacuum cleaner further includes a dirt collection region with an openable bottom and a cyclonic separator in the fluid flow path. The cyclonic separator includes a cyclone chamber having a first end wall and a second end wall, a cyclone dirty fluid inlet, and a cyclone clean fluid outlet. The vacuum cleaner further includes a filter chamber in the fluid flow path downstream from the cyclonic separator and upstream from the fluid flow motor. The filter chamber includes an outlet fluidly communicating the filter chamber and the fluid flow motor and a tangential inlet fluidly communicating the cyclonic separator and the filter chamber.

In one embodiment, the invention provides a vacuum cleaner including a fluid flow path extending from a dirty air inlet to a clean air outlet, a main body including a handle, and a fluid flow motor positioned in the fluid flow path. The vacuum cleaner further includes a cyclonic separator in the fluid flow path. The cyclonic separator includes a cyclone chamber having a first end wall, a second end wall, a sidewall extending along a cyclone axis, a cyclone dirty fluid inlet, and a cyclone clean fluid outlet. The vacuum cleaner further includes a filter chamber housing a cylindrical filter in the fluid flow path downstream from the cyclonic separator and upstream from the fluid flow motor. An axis defined by the cylindrical filter is transverse to the cyclone axis.

In another embodiment, the invention provides a vacuum cleaner including a fluid flow path extending from a dirty air inlet to a clean air outlet, a main body including a handle, and a fluid flow motor positioned in the fluid flow path. The vacuum cleaner further includes a cyclonic separator in the fluid flow path. The cyclonic separator includes a cyclone chamber having a first end wall, a second end wall, a sidewall extending along a cyclone axis, a cyclone dirty fluid inlet, and a cyclone clean fluid outlet. The vacuum cleaner further includes a filter chamber in the fluid flow path downstream from the cyclonic separator and upstream from the fluid flow motor, and an airflow passage between the cyclone clean fluid outlet and the filter chamber. The airflow passage defines an upstream cross-sectional area and defines a downstream cross-sectional area. The downstream cross-sectional area is larger than the upstream cross-sectional area.

In another embodiment, the invention provides a vacuum cleaner including a fluid flow path extending from a dirty air inlet to a clean air outlet, a fluid flow motor positioned in the fluid flow path, and a cyclonic separator in the fluid flow path. The cyclonic separator includes a cyclone chamber having a first end wall and a second end wall, a cyclone dirty fluid inlet, and a cyclone clean fluid outlet. The vacuum cleaner further includes a filter chamber in the fluid flow path downstream from the cyclonic separator and upstream from the fluid flow motor. The filter chamber houses a pre-motor filter having a first cylindrical filter and a second cylindrical filter. The second cylindrical filter is nested within the first cylindrical filter.

In another embodiment, the invention provides a vacuum cleaner including a fluid flow path extending from a dirty air inlet to a clean air outlet, a main body including a handle, and a fluid flow motor positioned in the fluid flow path. The vacuum cleaner further includes a cyclonic separator in the fluid flow path. The cyclonic separator includes a cyclone chamber having a first end wall, a second end wall, a sidewall extending along a cyclone axis, a cyclone dirty fluid inlet, and a cyclone clean fluid outlet. The vacuum cleaner further includes a filter chamber housing a pre-motor filter in the fluid flow path downstream from the cyclonic separator and upstream from the fluid flow motor. A gap between the pre-motor filter and an adjacent sidewall of the filter chamber is between 5 and 10 millimeters.

In another embodiment, the invention provide a handheld vacuum cleaner including a fluid flow path extending from a dirty air inlet to a clean air outlet, a main body including a handle, and a fluid flow motor positioned in the fluid flow path. The vacuum cleaner further includes a cyclonic separator in the fluid flow path. The cyclonic separator includes a cyclone chamber having a first end wall and a second end wall, a cyclone dirty fluid inlet, and a cyclone clean fluid outlet. The vacuum cleaner further includes a filter chamber housing a filter in the fluid flow path downstream from the cyclonic separator and upstream from the fluid flow motor. The filter chamber includes a lid removable to open the filter chamber and the filter is coupled to the lid.

In another embodiment, the invention provides a vacuum cleaner including a fluid flow path extending from a dirty air inlet to a clean air outlet, a fluid flow motor positioned in the fluid flow path, and a cyclonic separator in the fluid flow path. The vacuum cleaner further includes a filter chamber in the fluid flow path downstream from the cyclonic separator and upstream from the fluid flow motor. The filter chamber houses a pre-motor filter having a first stage filter and a second stage filter. The first stage filter is removable from the second stage filter.

In another embodiment, the invention provides a vacuum cleaner including a fluid flow path extending from a dirty air inlet to a clean air outlet, a main body including a handle, and a fluid flow motor positioned in the fluid flow path. The vacuum cleaner further includes a cyclonic separator in the fluid flow path. The cyclonic separator includes a cyclone chamber having a first end wall and a second end wall, a cyclone dirty fluid inlet, and a cyclone clean fluid outlet. The vacuum cleaner further includes a filter chamber in the fluid flow path downstream from the cyclonic separator and upstream from the fluid flow motor. The filter chamber includes an inlet fluidly communicating the cyclonic separator and the filter chamber. The filter chamber includes an outlet fluidly communicating the filter chamber and the fluid flow motor, and the inlet is perpendicular to the outlet.

In another embodiment, the invention provides a vacuum cleaner including a fluid flow path extending from a dirty air inlet to a clean air outlet, a main body including a handle, and a fluid flow motor positioned in the fluid flow path. The vacuum cleaner further includes a cyclonic separator in the fluid flow path. The cyclonic separator includes a cyclone chamber having a first end wall and a second end wall, a cyclone dirty fluid inlet, and a cyclone clean fluid outlet. The vacuum cleaner further includes a filter chamber in the fluid flow path downstream from the cyclonic separator and upstream from the fluid flow motor. The filter chamber includes an inlet fluidly communicating the cyclonic separator and the filter chamber and an outlet fluidly communicating the filter chamber and the fluid flow motor. The inlet includes a rectangular cross-section and the outlet includes a circular cross-section.

In another embodiment, the invention provides a vacuum cleaner including a fluid flow path extending from a dirty air inlet to a clean air outlet, a main body including a handle, and a fluid flow motor positioned in the fluid flow path. The vacuum cleaner further includes a cyclonic separator in the fluid flow path. The cyclonic separator includes a cyclone chamber having a first end wall, a second end wall, a sidewall extending along a cyclone axis, a cyclone dirty fluid inlet, and a cyclone clean fluid outlet. The vacuum cleaner further includes a filter chamber in the fluid flow path downstream from the cyclonic separator and upstream from the fluid flow motor. An axis defined by the filter chamber is perpendicular to the cyclone axis.

In another embodiment, the invention provides a vacuum cleaner including a fluid flow path extending from a dirty air inlet to a clean air outlet, a main body including a handle, a fluid flow motor positioned in the fluid flow path. The vacuum cleaner further includes a cyclonic separator in the fluid flow path, and a filter chamber housing a cylindrical filter in the fluid flow path downstream from the cyclonic separator and upstream from the fluid flow motor. The filter chamber includes a tangential inlet fluidly communicating the cyclonic separator and the filter chamber. The fluid flow path extends through the cylindrical filter in a normal flow orientation.

Other aspects of the invention will become apparent by consideration of the detailed description and accompanying drawings.

BRIEF DESCRIPTION OF THE DRAWINGS

FIG. 6 is a side view of the separator of FIG. 4.

FIG. 7 is a cross-sectional view of the separator of FIG. 4 taken along lines 7-7 shown in FIG. 4.

FIG. 10A is a cross-sectional view of the separator of FIG. 4 taken along lines 10A-10A shown in FIG. 10.

FIG. 13A is a perspective view of the filter assembly of FIG. 12 with a pre-motor filter removed from a filter chamber.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways

DETAILED DESCRIPTION

Figure 1:
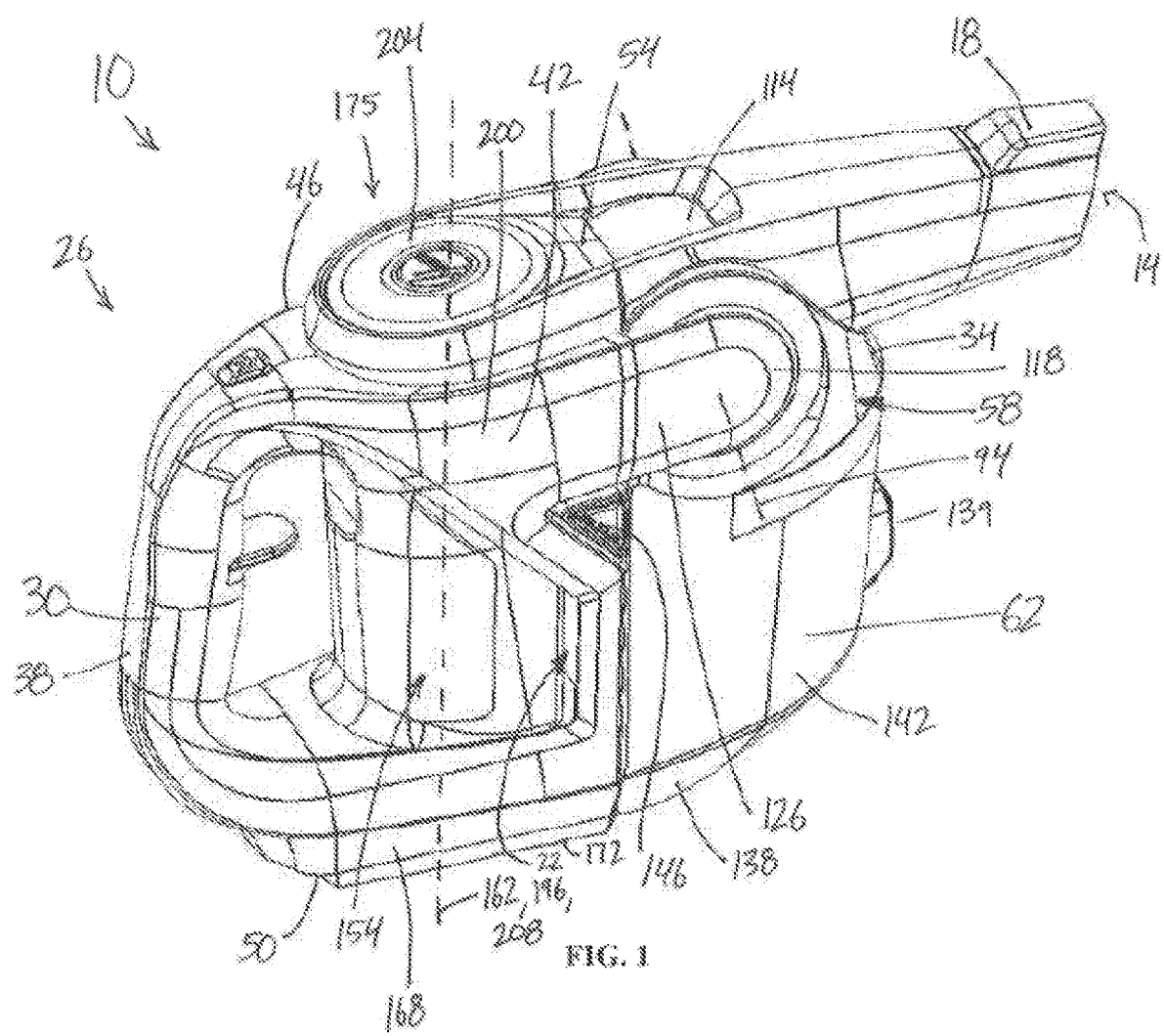
FIG. 1 is a perspective view of a handheld vacuum cleaner according to an embodiment of the invention.

FIGS. 1-15 illustrate a handheld vacuum cleaner 10. The handheld vacuum cleaner 10 includes a fluid flow path extending from a dirty air inlet 14 formed in a suction nozzle 18 to a clean air outlet 22 (FIG. 1). The handheld vacuum cleaner 10 also includes a main body 26 (i.e., a main housing) with a handle 30, a front end 34, a back end 38, a first side 42, a second side 46, a bottom 50, and a top 54. The dirty air inlet 14 and the suction nozzle 18 are located at the front end 34 of the main body 26. The handle 30 is located at the back end 38 and extends generally in a top-to-bottom direction along the main body 26. In other words, the handle 30 is oriented generally vertical when the handheld vacuum cleaner 10 is sitting on a horizontal surface.

With reference to FIGS. 1-11, the handheld vacuum cleaner 10 includes a cyclonic separator 58 and a dirt collection region 62. It is understood the cyclonic separator 58 is positioned in the fluid flow path and the assemblies illustrated in FIGS. 4-11 are utilized within the handheld vacuum cleaner 10 illustrated in FIGS. 1-3. In other words, FIGS. 4-11 schematically illustrate certain details of the handheld vacuum cleaner 10 with other components removed for clarity.

Figure 8:
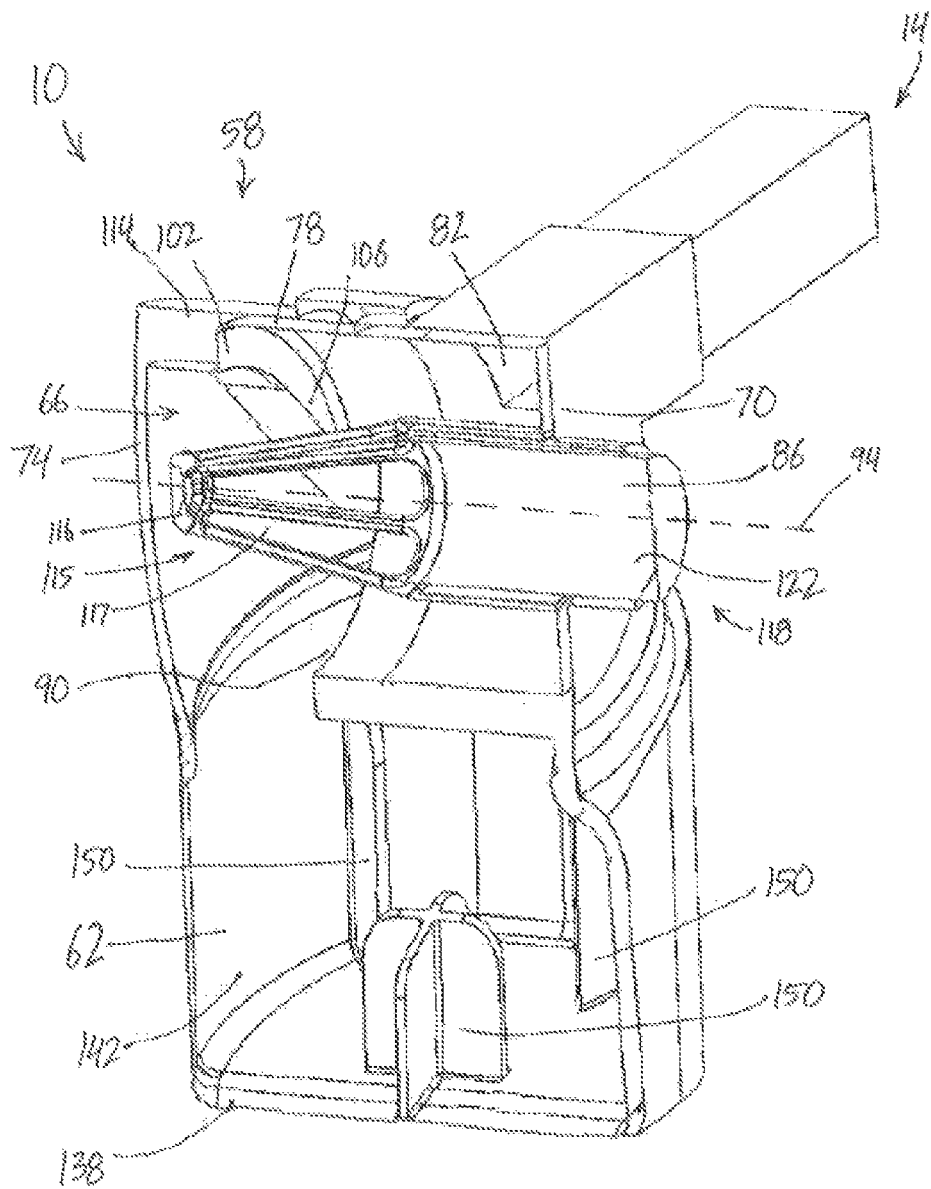
FIG. 8 is another cross-sectional view of the separator of FIG. 4 taken along lines 8-8 shown in FIG. 5.

With reference to FIGS. 4-11, the cyclonic separator 58 includes a cyclone chamber 66 (FIG. 7) having a first end wall 70, a second end wall 74, and a sidewall 78 extending between the first wall 70 and the second wall 74. The cyclonic separator 58 further includes a cyclone dirty fluid inlet 82 (FIG. 7), a cyclone clean fluid outlet 86, and cyclone dirt outlet 90 (FIG. 8). In the illustrated embodiment, the cyclone dirt outlet 90 is formed in the sidewall 78 proximal the second end wall 74, the cyclone dirty fluid inlet 82 is formed in the sidewall 78 proximate the first end wall 70, and the cyclone clean fluid outlet 86 is formed in the first end wall 70.

Figure 9:
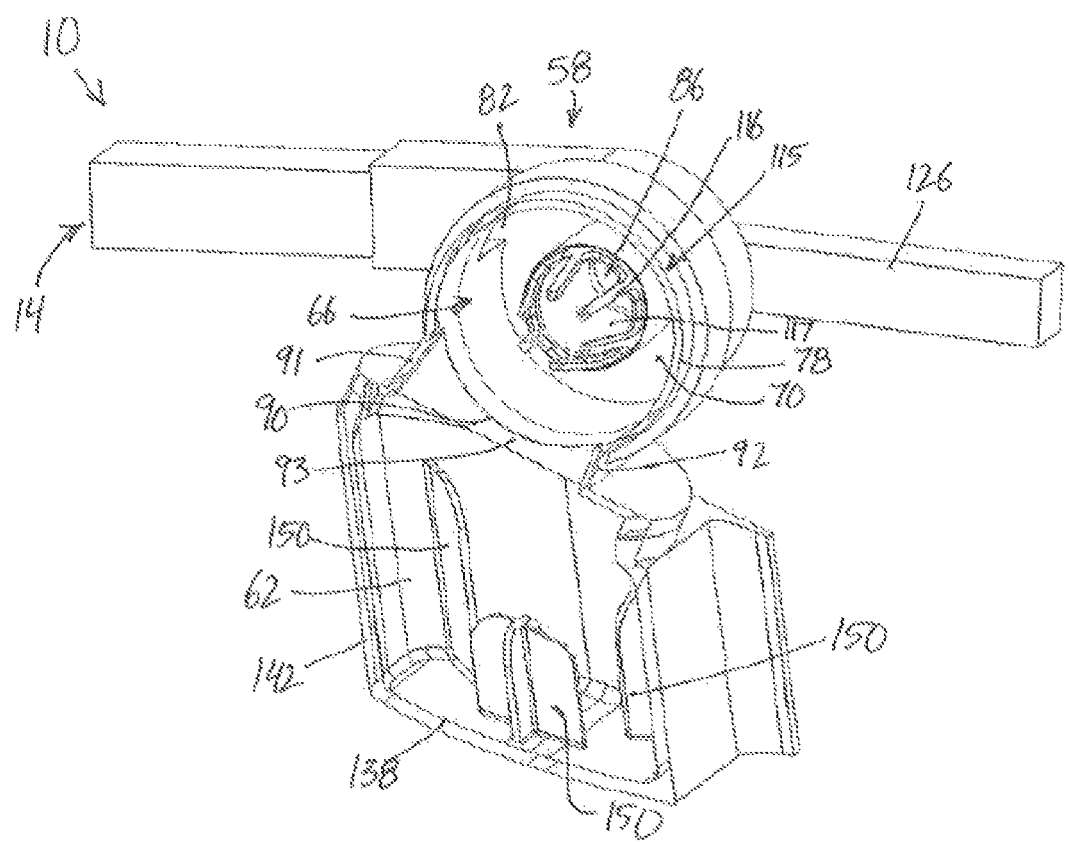
FIG. 9 is another cross-sectional view of the separator of FIG. 4 taken along lines 9-9 shown in FIG. 4.

With continued reference to FIG. 9, a flow-diverting wall 91 is positioned adjacent the cyclone dirt outlet 90. The flow-diverting wall 91 is positioned downstream from the cyclone dirt outlet 90 and debris exiting the cyclone dirt outlet 90 travels past an upstream wall 92 and impinges (i.e., impacts) the flow-diverting wall 91. This is a result of the airflow within the cyclonic separator moving in a generally clockwise direction, as viewed from FIG. 9. The flow-diverting wall 91 extends from the cyclone sidewall 78 between the cyclone chamber 66 and the dirt collection region 62 in a direction along a cyclone chamber axis 94 (FIG. 8). The flow-diverting wall 91 forms a downstream boundary of the cyclone dirt outlet 90 and intersects the fluid flow path adjacent the second end wall 74 between the cyclone chamber 66 and the dirt collection region 62. A duct 93 is formed in part by the flow-diverting wall 91 and the opposite wall 92 around the perimeter of the cyclone dirt outlet 90 in fluid communication with the dirt collection region 62. The flow-diverting wall 91 eliminates a common "knife-edge" formed in prior art designs between the edge of the material throw-off in cyclone sidewalls and the adjacent dust bin. Such "knife-edge" transitions in the prior art tended to catch debris flowing toward it forming a debris clog point that reduced performance in traditional prior art cyclonic separator designs. In the embodiment shown in FIG. 9, debris exiting the cyclone dirt outlet 90 that passes over the wall 92 and impacts the flow-diverting wall 91 is at least partially guided toward the dirt collection region 62, which has been found to inhibit clogging of the cyclone dirt outlet 90.

The cyclone chamber axis 94 is defined by the sidewall 78 and passes through the first end wall 70 and the second end wall 74 (FIG. 8). The first end wall 70 and the second end wall 74 of the cyclone chamber 66 both intersect a common horizontal plane 98 (FIG. 6) when the handheld vacuum cleaner 10 is positioned on a horizontal surface. In other words, normally the cyclone chamber axis 94 is approximately horizontal when the handheld vacuum cleaner 10 is in use. As used in the present description and claims, an approximately or generally horizontal orientation means an orientation that is tilted over such that it is not vertical or upright. The generally horizontal orientation includes various embodiments that are approximately parallel to the ground or floor, as well as orientations that are not parallel to the ground or floor but being generally more laying over than upright (i.e., being tilted more than about 45 degrees). For example, a horizontal orientation can include a cyclonic separator having a portion of a first end and a portion of a second end both intersecting a common horizontal plane.

Figure 10:
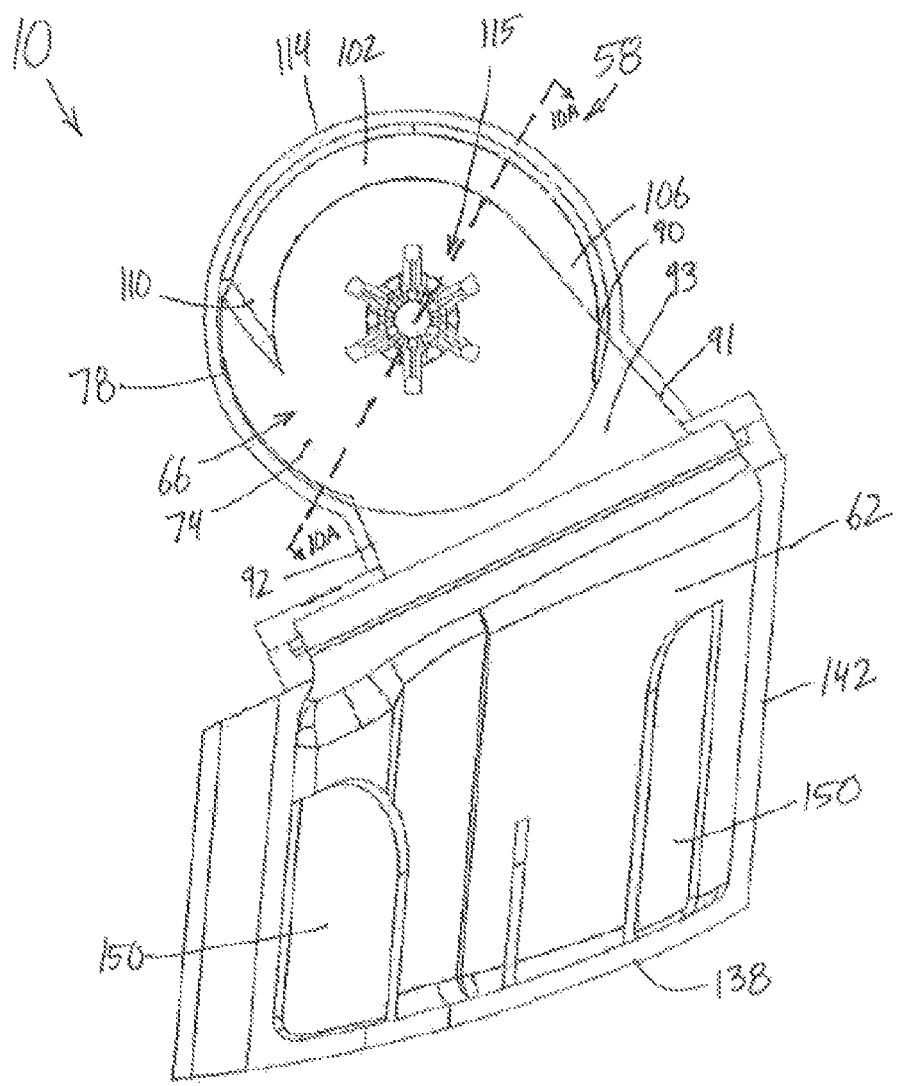
FIG. 10 is another cross-sectional view of the separator of FIG. 4 taken along lines 10-10 shown in FIG. 4.
Figure 11:
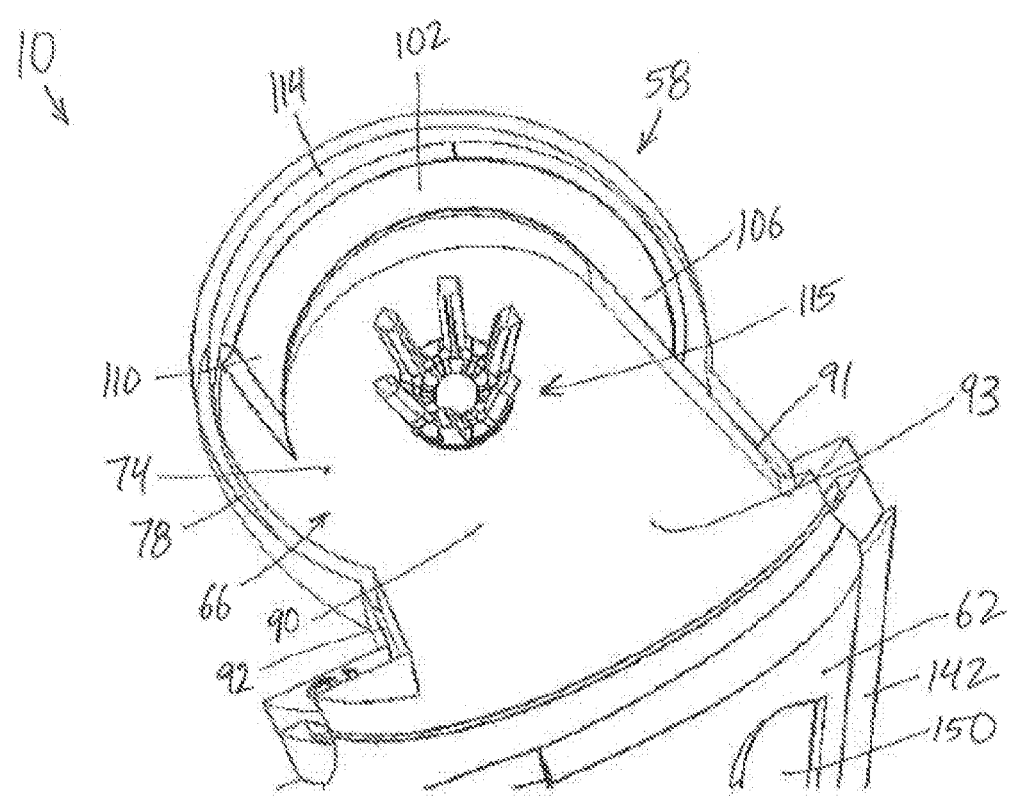
FIG. 11 is a partial perspective view of the cross-sectional view of FIG. 10.

With reference to FIGS. 10 and 11, the cyclonic separator 58 further includes a ramp 102 positioned in the cyclone chamber 66 around at least a portion of the second end wall 74 extending along the sidewall 78 toward the cyclone dirt outlet 90. In particular, the ramp 102 includes a beginning 106 spaced from the second end wall 74, and the ramp 102 includes an end 110 positioned at the second end wall 74 of the cyclone chamber 66. In the illustrated embodiment, a portion of the ramp surface 102 as viewed in a plane parallel to and through the cyclone chamber axis 94 is approximately perpendicular to the sidewall 78, shown as angle θ in FIG. 10A. Alternatively, the ramp surface angle θ may be at a non-perpendicular angle from the sidewall between about 30 degrees and 150 degrees. In yet another alternative, the ramp surface angle θ may be at a non-perpendicular angle from the sidewall between about 60 degrees and 120 degrees.

The ramp 102 is positioned such that the ramp end 110 positioned at the second end wall is along a flow path directed toward the cyclone dirt outlet 90 and the flow-diverting wall 91. In the illustrated embodiment, the ramp 102 is a helical ramp. The ramp 102 shown in FIG. 11 extends around an upper portion 114 of the sidewall 78; however, the ramp may be arranged along a middle portion or lower portion of the sidewall in embodiments having the cyclone dirt outlet in a different location than in the present embodiment. In the illustrated embodiment, the ramp 102 extends around approximately 180 degrees around the sidewall 78 (i.e., approximately half). In alternative embodiments, the ramp can extend around more or less of the perimeter of the cyclone to guide debris along a flow path directed toward the cyclone dirt outlet. The ramp may extend between about 90 degrees and 300 degrees around the cyclone perimeter. The ramp 102 guides debris in the cyclone chamber 66 to the cyclone dirt outlet 90. In addition, the ramp 102 inhibits the mixing of any air flow out of the cyclone through the dirt outlet with corresponding air flow in the cyclone across the cyclone dirt outlet 90, which in turn minimizes the re-entrainment of debris.

With reference to FIGS. 7 and 8, the cyclonic separator 58 further includes a shroud 115 positioned around a portion of the cyclone clean fluid outlet 86 configured to allow airflow from the cyclonic separator 58 to pass through the shroud 115 into the clean fluid outlet 86 and inhibiting passage of debris into the clean fluid outlet 86. In the illustrated embodiment, the shroud 115 includes a conical frame 116 with a mesh 117. The conical frame 116 and the mesh 117 provides more volume between the conical frame 116 and the sidewall 78 at the smaller end of the conical frame 116. The tangential flow of the swirling air and debris within the cyclonic separator 58 washes against the mesh 117 while the axial component of the flow pushes the debris toward the smaller end of the conical frame 116, which helps clear debris from the shroud 115 back into the separator flow. As such, a self-cleaning effect is achieved with the shroud 115 as debris is carried along with the flow, slowing the "wrapping" of debris in the cyclone chamber 66 around the shroud 115. Reducing the wrapping of debris inhibits clogging of the separator that formed in some prior art designs. In some embodiments, the shroud 115 and the first end wall 70 of the cyclonic separator 58 may be removable by a user from the first side 42 of the main body 26 to allow a user access to the cyclone chamber 66.

Figure 5:
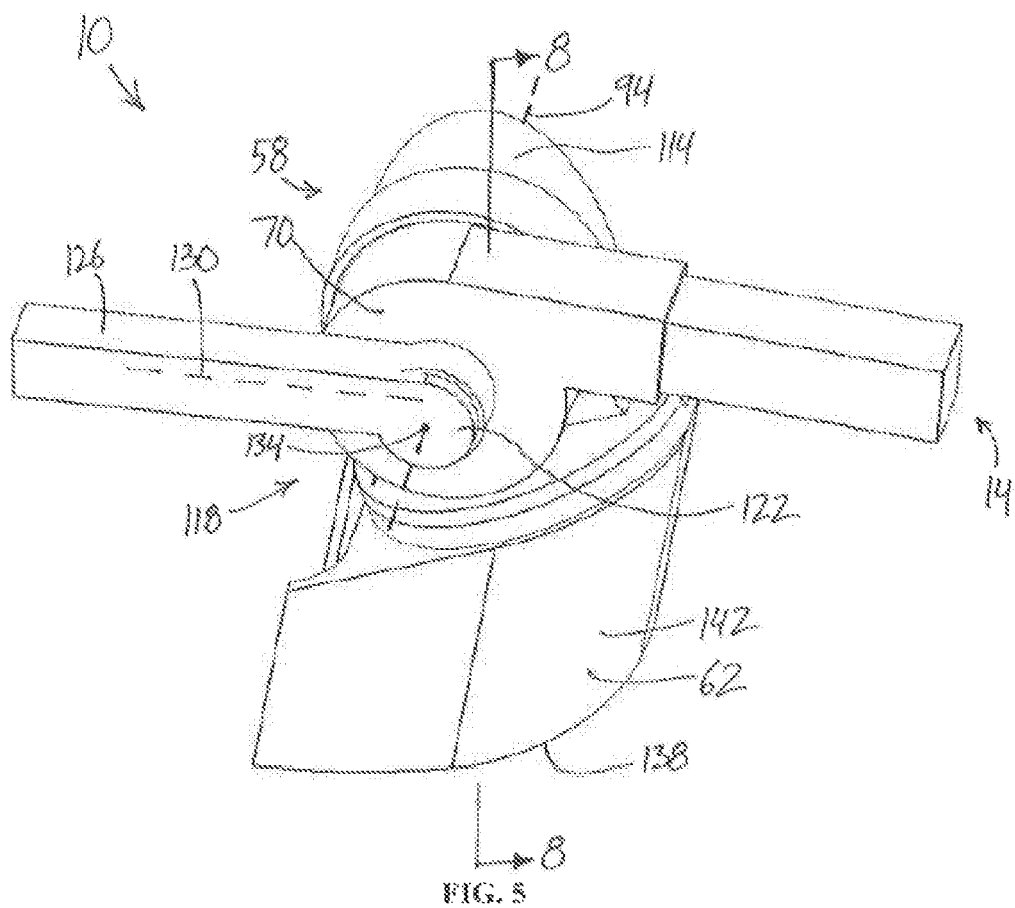
FIG. 5 is another perspective view of the separator of FIG. 4.

With reference to FIGS. 5-7, the handheld vacuum cleaner 10 further includes an outlet scroll 118 in fluid communication with the cyclone clean fluid outlet 86. The outlet scroll 118 includes a central portion 122 forming an end of the clean fluid outlet 86 and an airflow passage 126 downstream of the central portion 122. The outlet scroll 118 is configured to change the airflow path from a generally helical airflow along a first direction through the clean fluid outlet 86 to an airflow having less rotation along a second direction different than the first direction along the airflow passage 126 downstream of the central portion 122. In the illustrated embodiment, the first direction is along a first axis defined by the clean fluid outlet 86, and the second direction is along a second axis defined by the airflow passage 126 downstream of the central portion 122, where the second axis is transverse to the first axis. In other words, the outlet scroll 118 tends to straighten the flow as it passes from the cyclone clean fluid outlet 86 to the airflow passage 126. The airflow passage 126 is generally tangentially aligned with the central portion 122. In the illustrated embodiment, the central portion 122 is generally cylindrical having a dimension larger than a dimension of the airflow passage, the airflow passage 126 being radially offset in the central portion 122 in the direction of the airflow such that the airflow has a tangential exit from the central portion 122 into the airflow passage 126. More specifically, the airflow passage 126 defines a central longitudinal axis 130 that does not intersect a midpoint 134 of the central portion 122. The outlet scroll 118 is more compact than a 90-degree elbow that was required in prior designs to change direction from the center axis of the separator to the direction toward the filter assembly. In addition, the outlet scroll 118 converts the swirling flow along the clean fluid outlet 86 into a more straightened flow along the airflow passage 126, which retains some of the kinetic energy that would otherwise be lost in a 90-degree elbow, resulting in a lower pressure drop. In other words, as a result of the passage 126 being tangentially aligned with the central portion 122 in the airflow direction, clean air entering the central portion 122 from the cyclone clean fluid outlet 86 leaves the central portion 122 with a lower pressure drop when compared to traditional elbow turns.

With reference to FIGS. 1-3 and 8-10, the dirt collection region 62 (i.e., dirt collection chamber) is removably secured to the main body 26 and in fluid communication with the cyclone dirt outlet 90 of the cyclonic separator 58. The dirt collection region 62 includes an openable bottom door 138 on the bottom of the dirt collection region 62, which allows for emptying the dirt collection region 62. In the illustrated embodiment, the bottom door 138 is released by actuation of a catch 139 (FIG. 2), or other suitable releasable securing means. The dirt collection region 62 is at least partially defined by a transparent bin 142 that is removably secured to the main body 26 via a catch 146 (FIG. 1), or other suitable releasable securing means. In the illustrated embodiment, the bin 142 is both removable from the main body 26 and the bottom door 138 is openable. As such, the bottom of the dirt collection region 62 is openable when the bin 142 is removed from the main body 26 or attached to the main body 26. The dirt collection region 62 includes ribs 150 to deflect the flow of air and inhibit the debris contained in the dirt collection region 62 from becoming re-entrained in the airflow.

Figure 12:
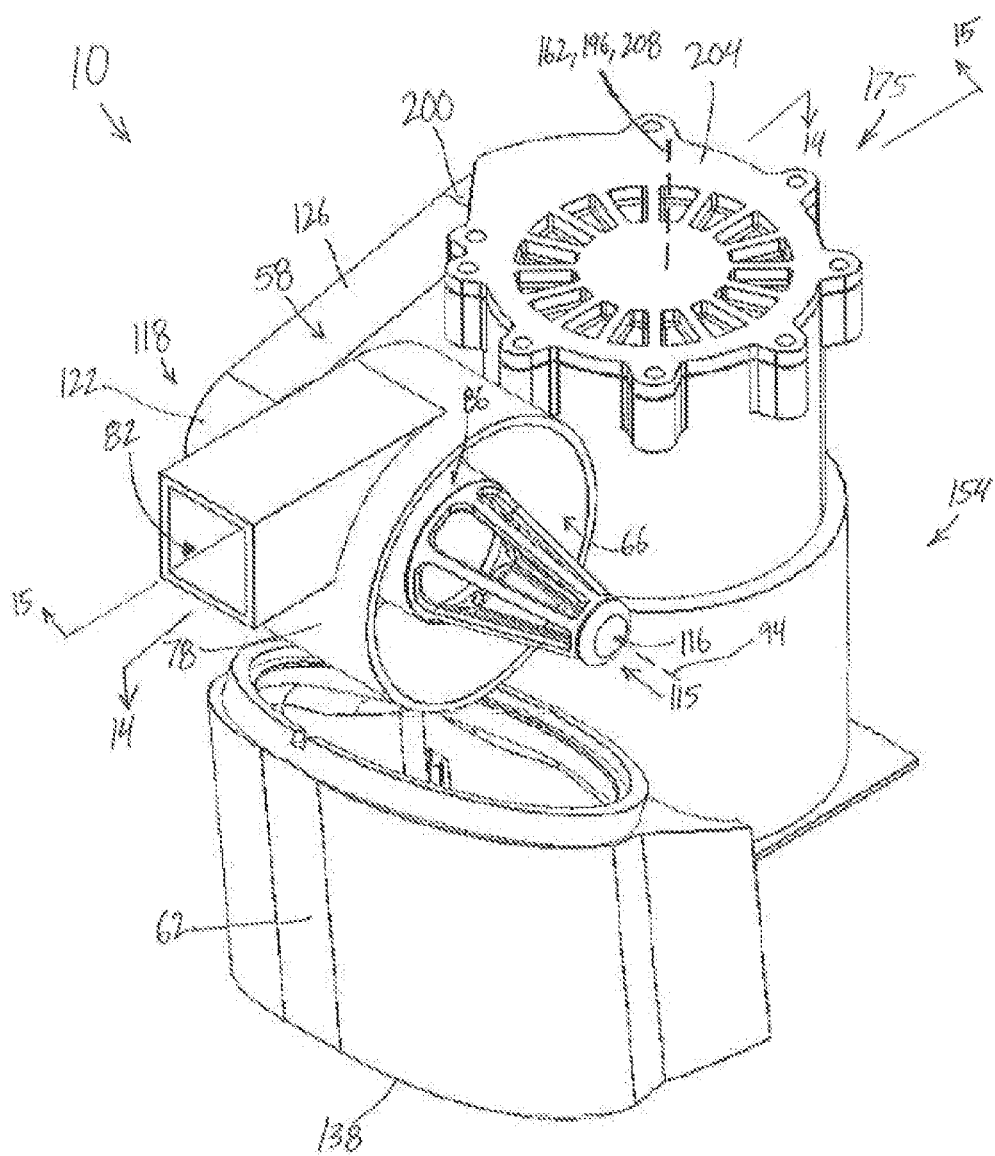
FIG. 12 is a perspective view of a filter assembly and a suction source according to an embodiment of the invention, with other components removed for clarity.
Figure 15:
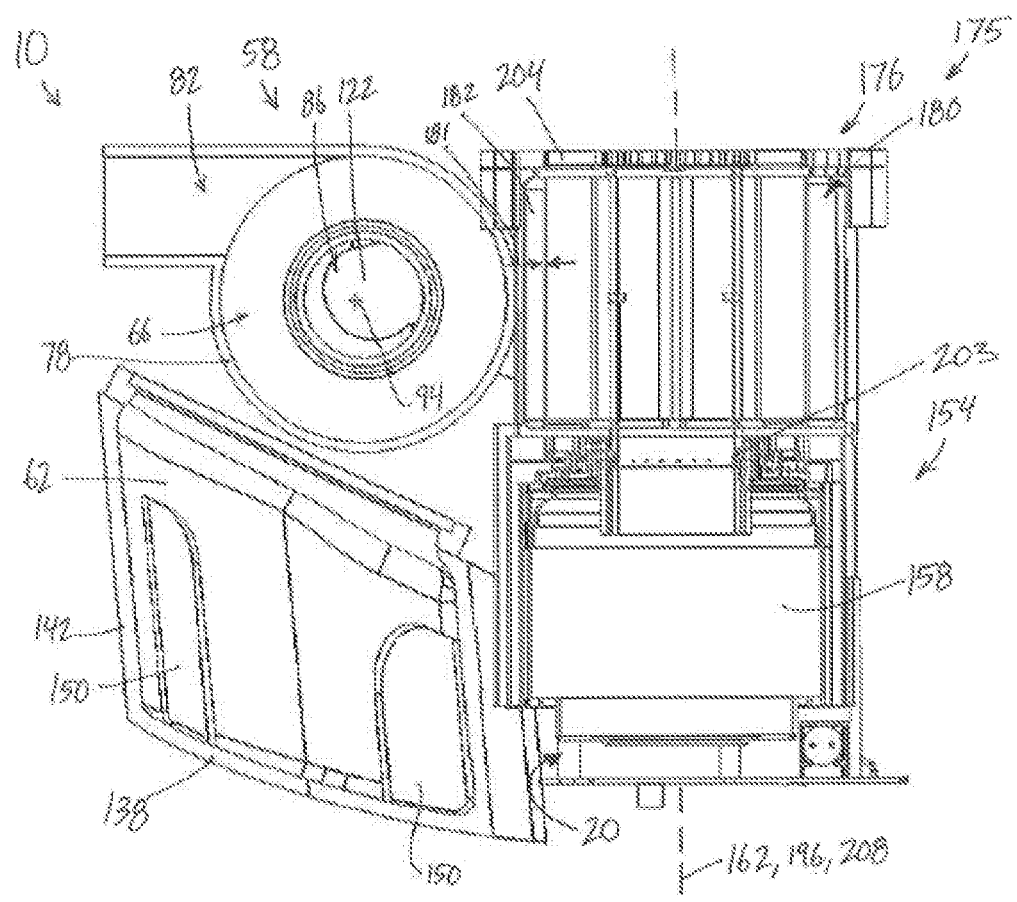
FIG. 15 is a cross-sectional view of the filter assembly and motor assembly of FIG. 12 taken along lines 15-15 shown in FIG. 12.

With reference to FIGS. 12 and 15, the handheld vacuum cleaner 10 further includes a suction source 154 positioned in the fluid flow path. The suction source 154 is located in the main body 26 and includes a fluid flow motor 158 (FIG. 15) and a fan operable to generate a fluid flow path (i.e., a suction airflow) through the handheld vacuum cleaner 10 that is drawn from the dirty air inlet 14 through the cyclonic separator 58 to a motor air outlet 20, which is ducted to the clean air outlet 22 (FIG. 1). The motor 158 defines a motor axis 162 and the motor 158 is operable to rotate the fan about the motor axis 162. In the illustrated embodiment, the motor 158 and the fan are oriented such that the motor axis 162 extends in a direction toward the bottom 50 and the top 54 of the main body 26 and therefore, the motor axis 162 is generally vertical when the vacuum is positioned on a horizontal surface. In other words, the fluid flow motor axis 162 of the fluid flow motor 158 is approximately vertical when the handheld vacuum cleaner 10 is positioned on a horizontal surface. The fluid flow motor axis 162 is positioned closer to the handle 30 than the cyclone chamber axis 94 is to the handle 30. The fluid flow motor axis 162 is offset from and approximately perpendicular to the cyclone chamber axis 94.

Figure 2:
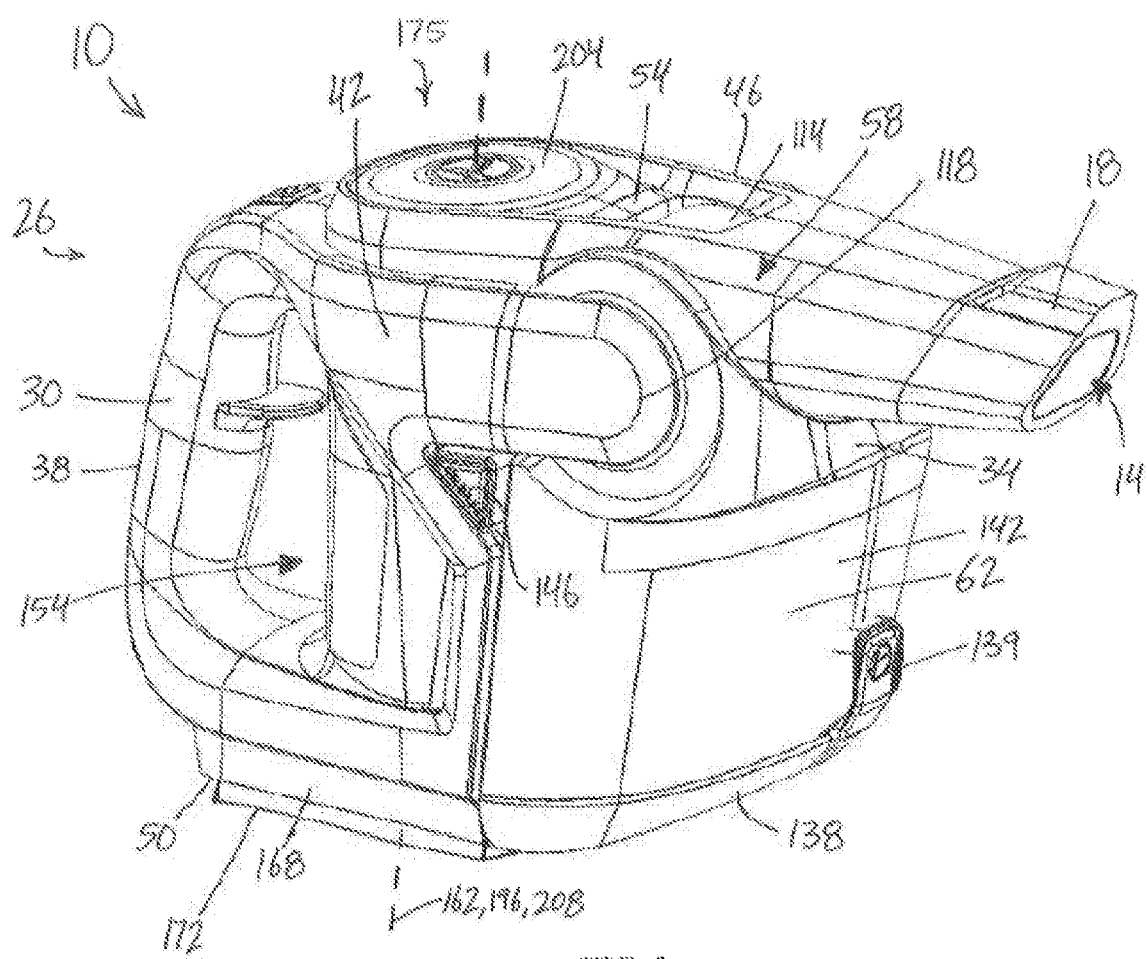
FIG. 2 is another perspective view of the handheld vacuum cleaner of FIG. 1.
Figure 3:
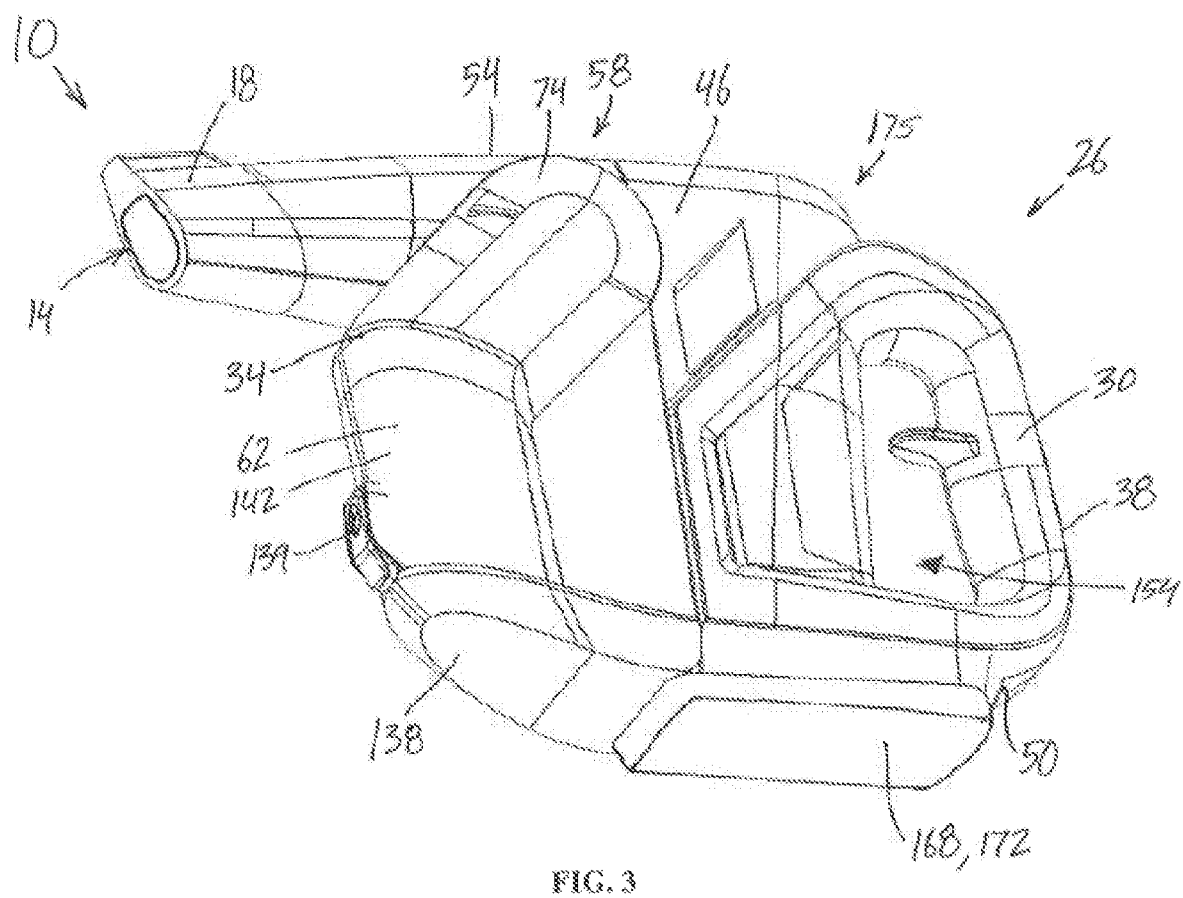
FIG. 3 is a bottom perspective view of the handheld vacuum cleaner of FIG. 1.
Figure 4:
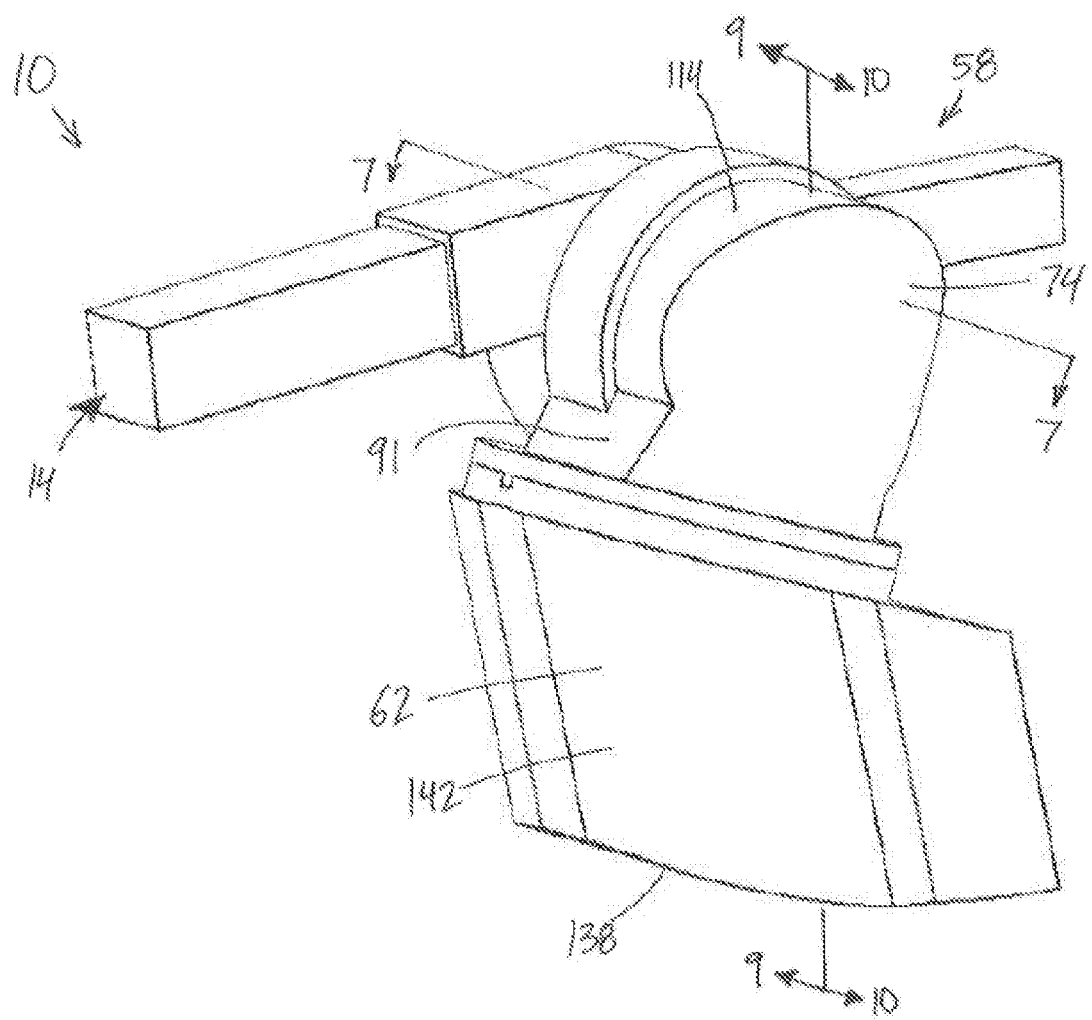
FIG. 4 is a perspective view of a separator according to an embodiment of the invention.

With reference to FIGS. 1-3, the handheld vacuum cleaner 10 includes a battery 168 (i.e., a removable, rechargeable battery pack) to supply power to the suction source 154 to operate the motor 158 and other electrical components. The battery 168 is positioned at least partially below the bottom openable door 138 of the dirt collection region 62. When the battery 168 is attached to the main body 26, the handheld vacuum cleaner 10 is supported solely on the battery 168 when positioned on the horizontal surface. In other words, the battery 168 provides a bottom surface 172 that allows the entire handheld vacuum cleaner 10 to be supported by the battery 168 when the handheld vacuum cleaner is positioned on a horizontal surface.

Figure 13:
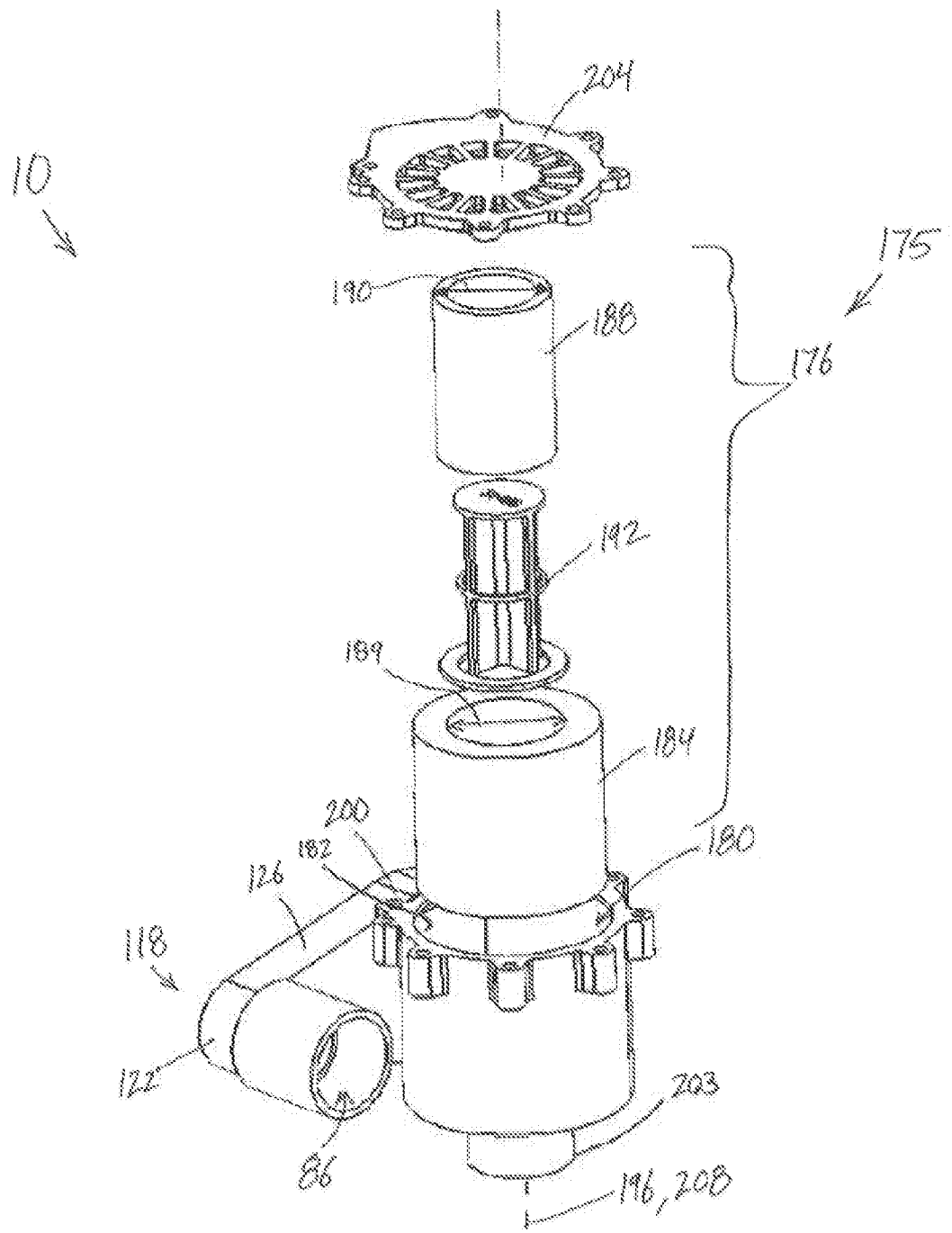
FIG. 13 is an exploded view of the filter assembly of FIG. 12.

With reference to FIGS. 12-15, the handheld vacuum cleaner 10 further includes a filter assembly 175 having a pre-motor filter 176 and a filter chamber 180. The pre-motor filter assembly 175 is located in the main body 26 with the filter chamber 180 positioned above the motor 158. The pre-motor filter 176 and the filter chamber 180 are in the fluid flow path downstream from the cyclonic separator 58 and are upstream from the fluid flow motor 158. The pre-motor filter 176 and filter chamber 180 are positioned between the handle 30 and the cyclonic separator 58. The pre-motor filter 176 filters the fluid flow path before the air travels through the fan and the motor 158. With reference to FIG. 13, the pre-motor filter 176 has a first cylindrical filter 184, optionally a second cylindrical filter 188, and a filter frame 192. The second cylindrical filter 188 is nested within and removable from the first cylindrical filter 184, and both filters 184, 188 are positioned around the filter frame 192. In the illustrated embodiment, the first cylindrical filter 184 defines an inner diameter 189 (FIG. 13) and the second cylindrical filter 188 defines an outer diameter 190, and the inner diameter 189 and the outer diameter 190 are approximately equal (e.g., within approximately 1 mm, 5 mm, 10 mm, etc. of each other). In some embodiments, the inner diameter 189 of the first cylindrical filter 184 is smaller than the outer diameter 190 of the second cylindrical filter 188 such that the second cylindrical filter 188 is slightly compressed (i.e. deformed) in order to be nested within the first cylindrical filter 184 in a press-fit type configuration. In alternative embodiments, there exists a gap radially between the first cylindrical filter 184 and the second cylindrical filter 188.

The filter frame may be integral with one of the first or second cylindrical filters, and for some embodiments the filter frame is omitted. In the illustrated embodiment, the second cylindrical filter 188 is configured to remove finer particles from the airflow than the first cylindrical filter 184 and the combination of the first and second cylindrical filters provides desired filtration of the airflow. In alternative embodiments, the first cylindrical filter 184 provides desired filtration of the airflow and the second cylindrical filter 188 is omitted. The first cylindrical filter 184 and second cylindrical filter 188 may be any desired filter media, including pleated or non-pleated, non-woven fiber, foam, or other media. The pre-motor filter 176 defines a filter axis 196 that is co-axial with the fluid flow motor axis 162 when the pre-motor filter 176 is assembled within the filter chamber 180. In addition, the filter axis 196 is transverse to the cyclone axis 94. In the illustrated embodiment, the filter axis 196 defined by the cylindrical pre-motor filter 176 is perpendicular to the cyclone chamber axis 94. In alternative embodiments, the pre-motor filter assembly 175 may be positioned such that the filter axis 196 is offset from and parallel to the motor axis.

Figure 14:
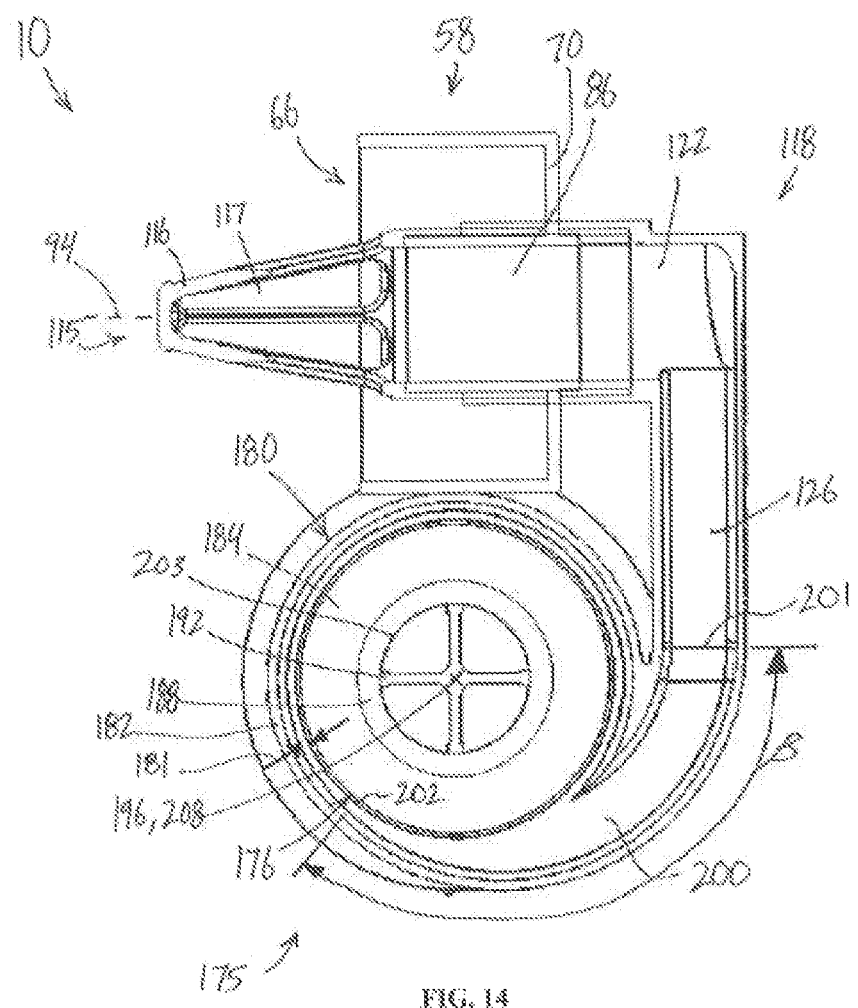
FIG. 14 is a cross-sectional view of the filter assembly and suction source of FIG. 12 taken along lines 14-14 shown in FIG. 12.

With reference to FIGS. 12-14, the filter chamber 180 includes a tangential inlet 200 fluidly communicating the cyclonic separator 58 and the filter chamber 180. In particular, the airflow passage 126 extends between the cyclone clean fluid outlet 86 (more specifically, the outlet scroll 118) and the tangential inlet 200. The passage 126 ends downstream with the tangential inlet 200 to the filter chamber 180, the tangential inlet 200 providing a smooth airflow transition into the filter chamber 180 reducing the velocity of the airflow into the pre-motor filter 176. More specifically, the inlet 200 to the filter chamber 180 shown in FIG. 14 is a scroll inlet. The airflow passage 126 is positioned providing an entry 201 to the scroll inlet 200 adjacent the filter chamber 180. The scroll inlet 200 is an arcuate passage from an entry 201 to a tangential entry 202 to the filter chamber 180. The tangential entry 202 to the filter chamber 180 may be between 90 and 360 degrees from the entry 201 to the scroll inlet 200, shown as angle θ in FIG. 14. In other words, the filter chamber 180 includes a scroll inlet 200 having a tangential inlet 202 to the filter chamber 180 between 90 and 360 degrees from entry 201 of the scroll inlet 200. In some embodiments, part or all of the passage 126 and the outlet scroll 118 are openable to allow a user access to the same.

With continued reference to FIGS. 13-15, the filter chamber 180 also includes an outlet 203 fluidly communicating the filter chamber 180 and the fluid flow motor 158. In the illustrated embodiment, the outlet 203 is perpendicular to the tangential inlet 200. For example, with the vacuum cleaner 10 positioned on a horizontal surface, the fluid flow enters the tangential inlet 200 generally horizontal and leaves the outlet 203 generally vertically (i.e., the fluid flow makes approximately a 90 degree turn in the filter chamber 180). The fluid flow path extends through the cylindrical filters 184, 188 in a normal flow orientation (i.e., the fluid flow move radially inwards toward the center of the cylindrical filters 184, 188). In some embodiments, the inlet 200 includes a rectangular cross-section shape and the outlet 203 includes a circular cross-section shape.

With reference to FIGS. 12 and 13, the filter chamber 180 is openable from the top 54 of the main body 26 when the handheld vacuum cleaner 10 is positioned on a horizontal surface. In particular, a removable lid 204 is provided on the top of the filter chamber 180 that may be opened by a user. As such, the pre-motor filter 176 is removable from the top of the filter chamber 180 through the top 54 of the main body 26. In some embodiments, the pre-motor filter 176 is attached to the lid 204 such that the lid acts as a handle to lift the filter out of the filter chamber. In some embodiments, the first cylindrical filter 184 is coupled to the removable lid 204 and the first cylindrical filter 184 is removed with the lid 204 by a user, leaving the second cylindrical filter 188 behind in the filter chamber 180. Alternatively or additionally, the filter frame 192 is attached to or integral with the lid 204 as shown in FIG. 13A.

The pre-motor filter 176 is positioned in the filter chamber 180. The filter chamber 180 is configured to provide a gap 181 (FIGS. 14 and 15) between the pre-motor filter 176 and an adjacent sidewall 182 of the filter chamber 180 between 5 and 10 millimeters. In one alternative, the gap 181 between the pre-motor filter 176 and adjacent sidewall 182 of the filter chamber 180 is between 5 and 8 millimeters. In another alternative, the gap 181 between the pre-motor filter 176 and adjacent sidewall 182 of the filter chamber 180 is between 8 and 10 millimeters. In other embodiments, the gap 181 between the pre-motor filter 176 and the adjacent sidewall 182 of the filter chamber 180 is larger than 5 millimeters to provide the desired airflow around the filter.

The airflow passage 126 extends in a lengthwise direction between the cyclonic separator 58 and the filter chamber 180, and has a height 124 and a width 125. As shown in FIG. 13A, the height 124 of the airflow passage 126 may increase along the downstream direction to slow the velocity of the air passing through the passage 126. Alternatively or additionally, the width 125 of the airflow passage 126 may increase along the downstream direction. In other words, with reference to FIG. 13A, the airflow passage 126 defines an upstream cross-sectional area 127 and defines a downstream cross-sectional area 128, and the downstream cross-sectional area 128 is larger than the upstream cross-sectional area 127 (i.e., the airflow passage 126 increases in volume along the downstream direction).

With reference to FIGS. 1-15, the handheld vacuum cleaner 10 includes a layout including the dirt collection region 62 generally located below the cyclonic separator 58 and adjacent the battery 168 and the suction source 154. The battery 168 is positioned below the fluid flow motor 158. In the embodiment illustrated in FIGS. 1-2, the battery 168 is entirely positioned below the fluid flow motor 158. The fluid flow motor 158 is positioned between the dirt collection region 62 and the handle 30. The filter chamber 180 is positioned above the fluid flow motor 158 when the handheld vacuum cleaner 10 is positioned on a horizontal surface. Furthermore, the filter chamber 180 defines a filter chamber axis 208 that is coaxial with the fluid flow motor axis 162 and the filter axis 196. In alternative embodiments, the filter chamber axis 208 is offset from and parallel to the fluid flow motor axis 162. In the illustrated embodiment, the filter chamber axis 208 is perpendicular to the cyclone chamber axis 94. The filter chamber 180 and the fluid flow motor 158 are both positioned between the cyclonic separator 58 and the handle 30.

In operation, the battery 168 provides power to the motor 158 to rotate the fan to generate a suction airflow that is drawn through the suction nozzle 18 along with debris. The airflow, entrained with debris, travels to cyclone dirty fluid inlet 82 of the cyclonic separator 58. The airflow and debris travel into the cyclone chamber 66 where the airflow and debris rotate about the cyclone chamber axis 94. Rotation of the airflow and debris causes the debris to separate from the airflow and the debris is discharged through the cyclone dirt outlet 90. The ramp 102 aids in expelling the separated debris out the cyclone dirt outlet 90. The separated debris then falls into the dirt collection region 62. The clean air travels through the shroud 115 into the cyclone clean fluid outlet 86. The clean airflow then travels through the outlet scroll 118 and is routed to the tangential inlet 200 of the filter chamber 180. The airflow then travels through the pre-motor filter 176 before traveling through the suction source 154. After traveling through the suction source 154, the airflow is exhausted from the handheld vacuum cleaner 10 through exhaust openings in the main body 26.

After using the handheld vacuum cleaner 10, the user can open the door 138 to empty the dirt collection region 62. After several uses, debris may have collected on the shroud 115 and within the cyclone chamber 66. If so, the user can open or remove a portion of the first end wall 70 and outlet scroll 118 to remove the shroud 115 from the cyclonic separator 58. This allows the user to clean the shroud 115 and inside the sidewall 78. In addition, opening the removable lid 204 provides the user access to the filter chamber 180 and the pre-motor filter 176 so the user can clean or replace the pre-motor filter 176.

Figure 16:
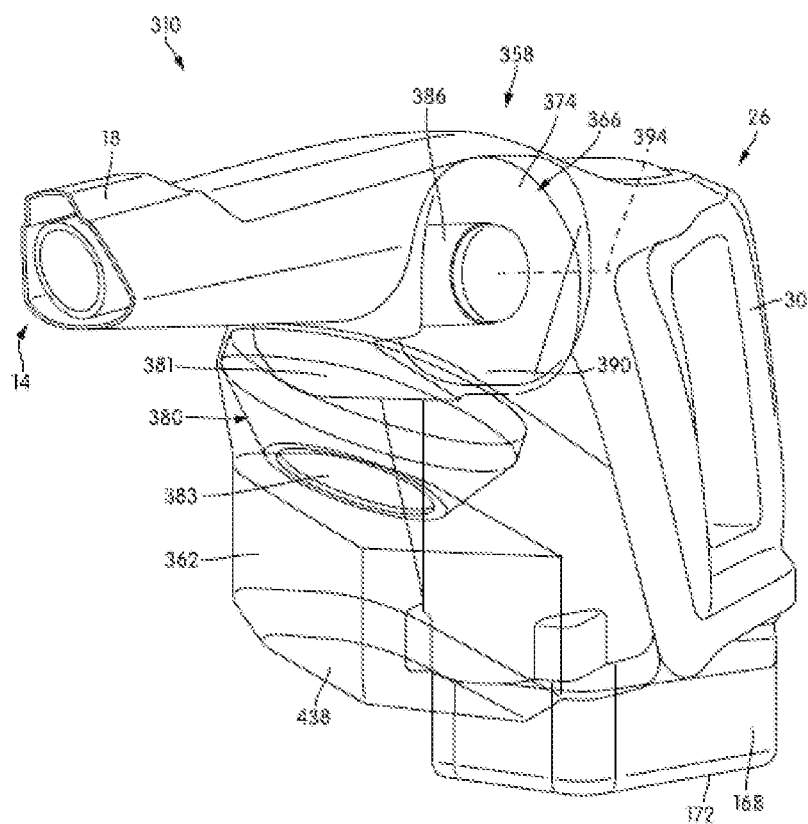
FIG. 16 is a perspective view of a handheld vacuum cleaner according to another embodiment of the invention.
Figure 17:
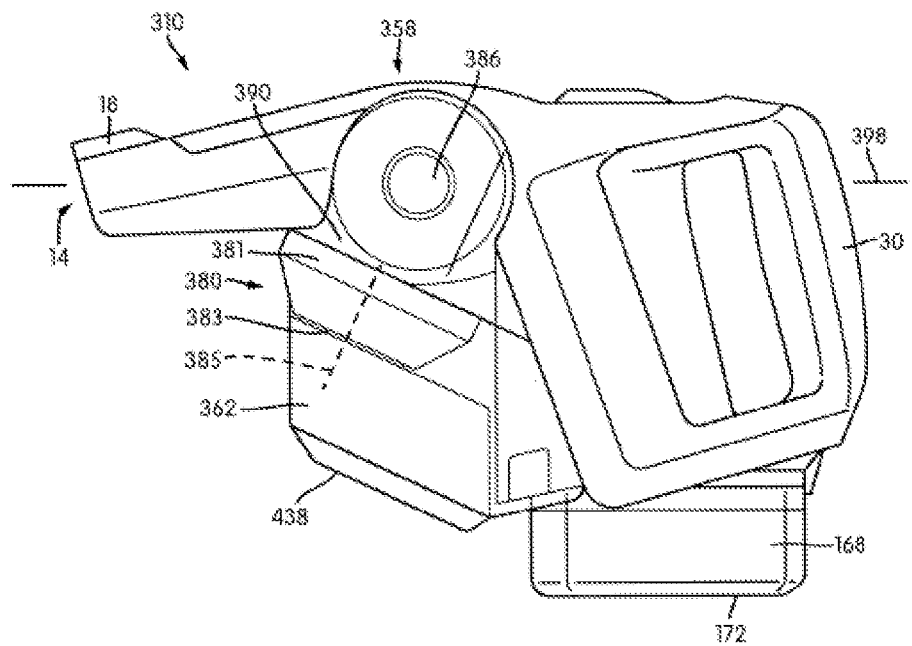
FIG. 17 is a side view of the handheld vacuum cleaner of FIG. 16.
Figure 18:
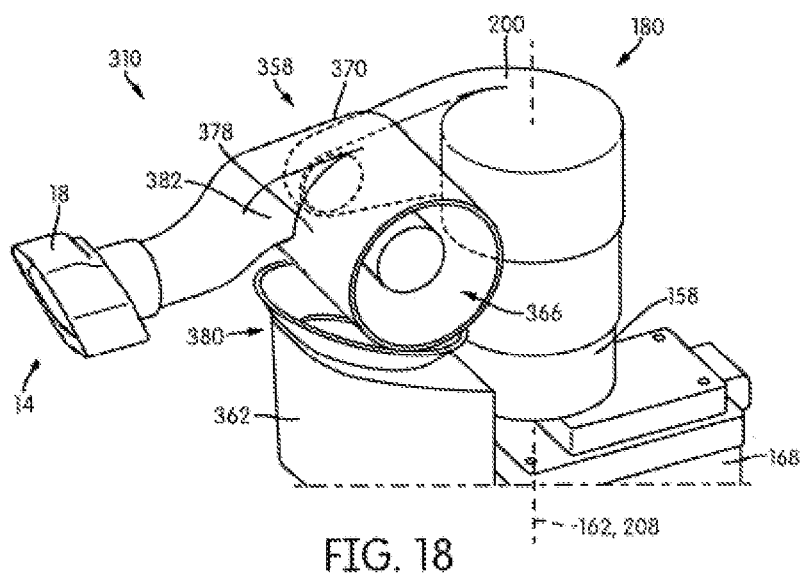
FIG. 18 is a perspective schematic view of the handheld vacuum cleaner of FIG. 16.
Figure 19:
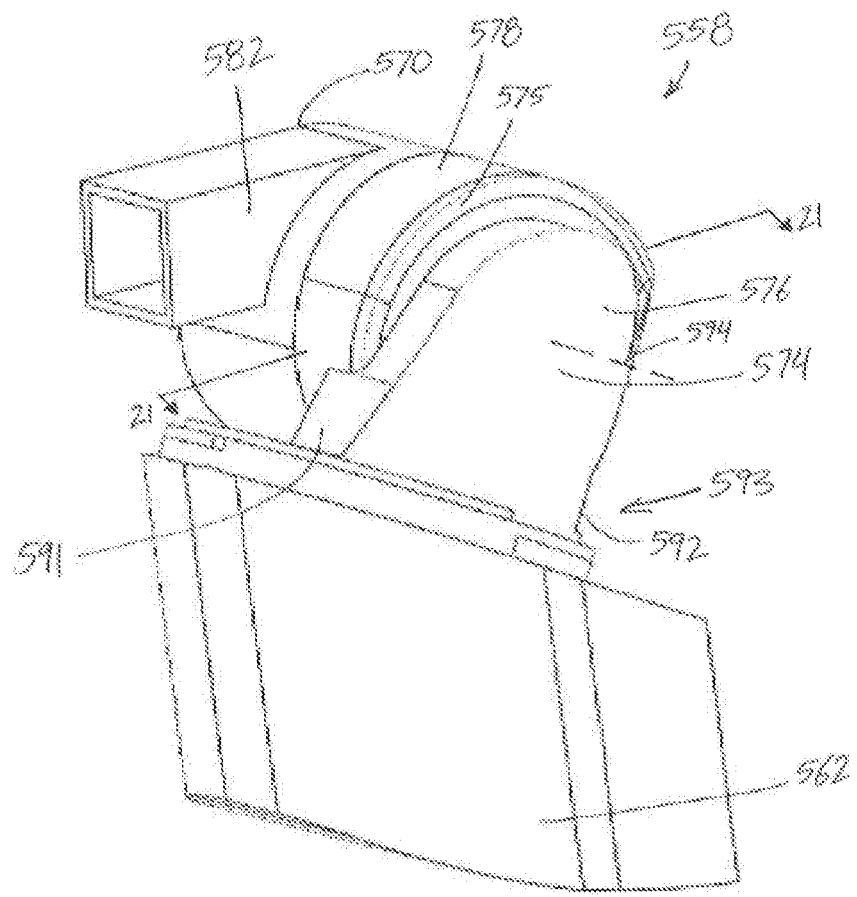
FIG. 19 is a perspective view of a separator according to an alternative embodiment of the invention.
Figure 20:
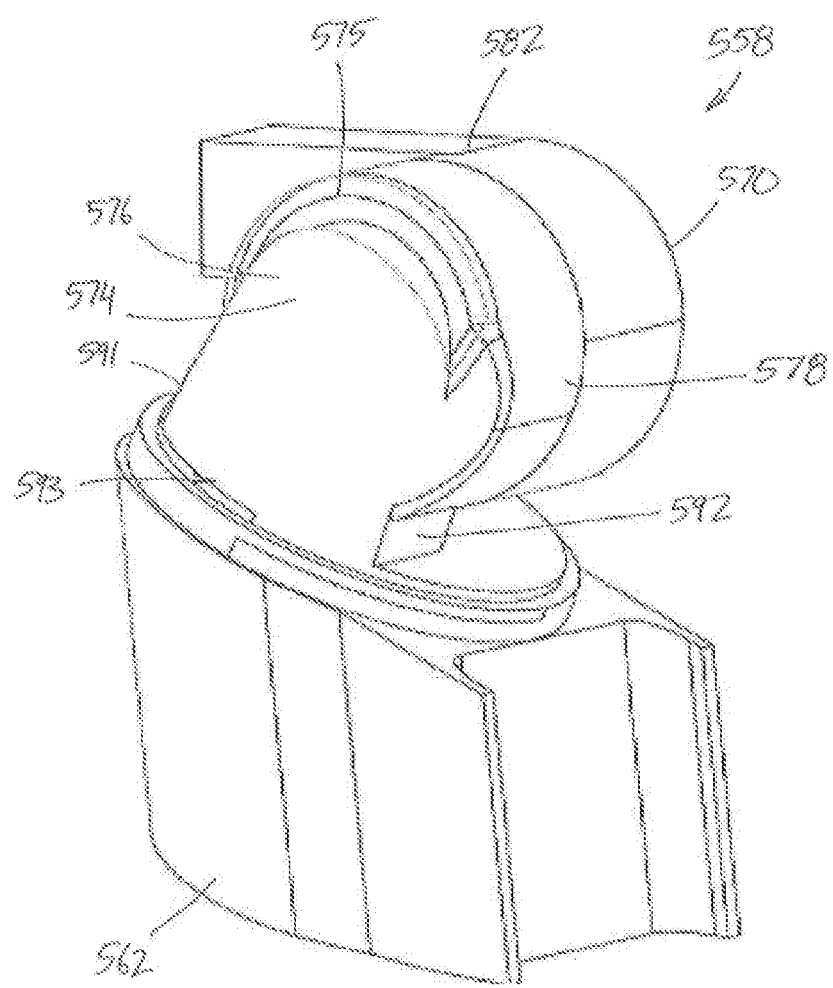
FIG. 20 is another perspective view of the separator of FIG. 19.

With reference to FIGS. 16-18, an alternative handheld vacuum cleaner 310 is illustrated. The alternative handheld vacuum cleaner 310 is similar to and includes many of the same components as the handheld vacuum cleaner 10 illustrated in FIGS. 1-15. As such, like components are reference the same with only the differences described in detail below. Similar to the handheld vacuum cleaner 10, the handheld vacuum cleaner 310 includes a fluid flow path extending from a dirty air inlet 14 formed in a suction nozzle 18 to a clean air outlet. The handheld vacuum cleaner 310 also includes a main body 26 with a handle 30, and a fluid flow motor 158 (FIG. 18) and a cyclonic separator 358 positioned in the fluid flow path.

The cyclonic separator 358 includes a cyclone chamber 366 having a first end wall 370, a second end wall 374, and a sidewall 378 extending between the first end wall 370 and the second end wall 374. The cyclonic separator 358 further includes a cyclone dirty fluid inlet 382, a cyclone clean fluid outlet 386, and a cyclone dirt outlet 390. A cyclone chamber axis 394 (FIG. 16) passes through the first end wall 370 and the second end wall 374. The first end wall 370 and the second end wall 374 of the cyclone chamber 366 both intersect a common horizontal plane 398 when the handheld vacuum cleaner 310 is positioned on a horizontal surface. In other words, normally the cyclone chamber axis 394 is approximately horizontal when the handheld vacuum cleaner 310 is in use.

A debris deceleration chamber 380 is positioned between the cyclone chamber 366 and a dirt collection region 362. The debris deceleration chamber 380 is in fluid communication with the cyclonic separator 358 and the dirt collection region 362. In particular, the debris deceleration chamber 380 is in fluid communication with the cyclone dirt outlet 390. In the illustrated embodiment, the debris deceleration chamber 380 is conical or funnel shaped defining a deceleration chamber axis 385 that is transverse to the cyclone axis 394. In the illustrated embodiment, the chamber axis 385 is approximately perpendicular to the cyclone axis 394. The debris deceleration chamber 380 includes an inlet 381 that is larger in cross-sectional area than an outlet 383. The outlet 383 of the debris deceleration chamber 380 is in fluid communication with the dirt collection region 362. Dirt exiting the cyclone dirt outlet 390 having a general flow direction around the cyclone axis 394 enters the debris deceleration chamber 380 which turns the flow in a direction around the chamber axis 385 where the velocity of the dirt is decreased before entering the dirt collection region 362. The slower debris speed created by the debris deceleration chamber 380 helps prevent debris in the dirt collection region 362 from becoming re-entrained in the fluid flow path. The debris deceleration chamber 380 defines the axis 385 (FIG. 17) that passes through the inlet 381 and the outlet 383. The axis 385 is generally askew and is neither oriented vertically nor horizontally. In the illustrated embodiment, the axis is approximately 30 degrees from vertical.

With reference to FIG. 17, the dirt collection region 362 includes an openable bottom door 438. The door 438 is openable while the handheld vacuum cleaner 310 is supported solely on a battery 168. In other words, a bottom surface 172 of the battery 168 is below the openable door 438. With reference to FIG. 18, the handheld vacuum cleaner 310 further includes a filter chamber 180 with a tangential inlet 200. The filter chamber 180 defines a filter chamber axis 208 that is coaxial with a motor axis 162 of a motor 158.

With reference to FIGS. 19-22, an alternative cyclonic separator 558 is illustrated. The alternative cyclonic separator 558 is similar to and includes many of the same components as the cyclonic separator 58 illustrated in FIGS. 4-11. As such, like components are referenced the same with only the differences described in detail below. It is understood that the cyclonic separator 558 can be implemented in either of the handheld vacuum cleaners 10, 310 described above. Similar to the cyclonic separator 58, the cyclonic separator 558 is positioned in the fluid flow path.

The cyclonic separator 558 includes a cyclone chamber 566 having a first end wall 570, a second end wall 574, and a sidewall 578 extending along a cyclone axis 594 between the first end wall 570 and the second end wall 574. The cyclonic separator 558 further includes a cyclone dirt fluid inlet 582, a cyclone clean fluid outlet, and a cyclone dirt outlet 590 formed in the sidewall 578. The cyclone chamber axis 594 passes through the first end wall 570 and the second end wall 574. The first end wall 570 and the second end wall 574 of the cyclone chamber 566 both intersect a common horizontal plane when the handheld vacuum cleaner is positioned on a horizontal surface. In other words, normally the cyclone chamber axis 594 is approximately horizontal when the handheld vacuum cleaner is in use.

Figure 21:
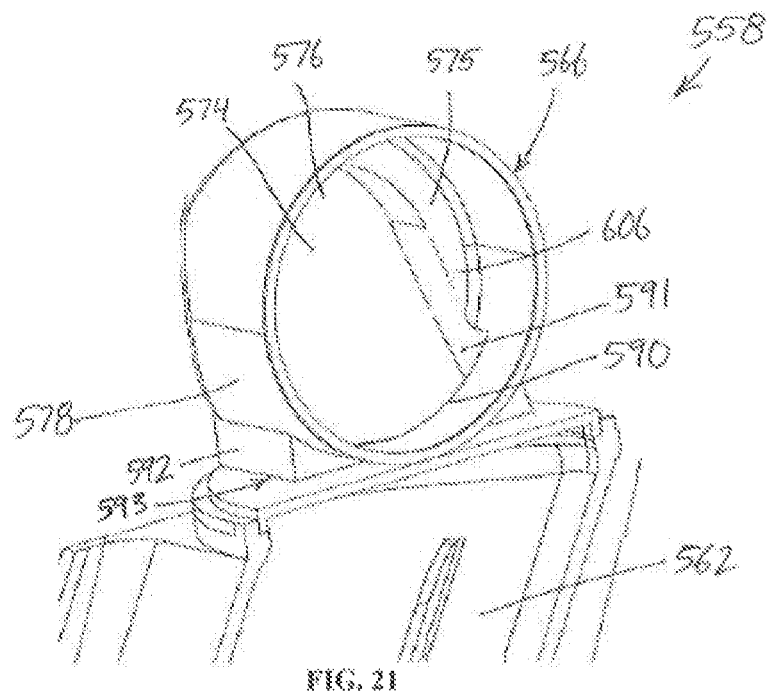
FIG. 21 is a perspective view of a cross-section of the separator of FIG. 19 taken along lines 21-21 shown in FIG. 19.
Figure 22:
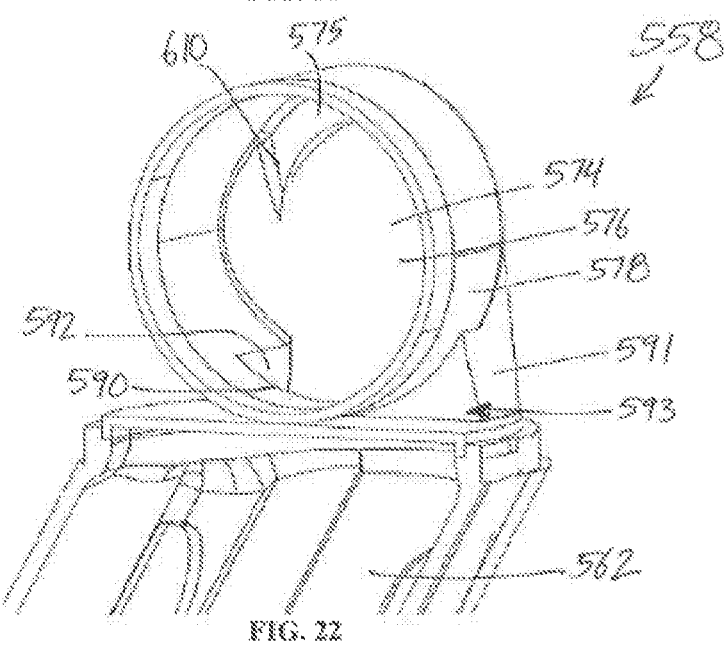
FIG. 22 is another perspective view of the cross-section of the separator of FIG. 19 taken along lines 21-21 shown in FIG. 19.

With reference to FIGS. 21 and 22, the second end wall 574 includes an inner portion 575 and an outer portion 576. The outer portion 576 is offset from the inner portion 575 in a direction away from the first end wall 570. A flow-diverting wall 591 connects the inner portion 575 and the outer portion 576 of the second end wall 574, which bounds the downstream end of the cyclone dirt outlet 590. In other words, the flow-diverting wall 591 forms a downstream boundary of the cyclone dirt outlet 590, and the flow-diverting wall 591 is positioned along the direction of the cyclone axis 594. The flow-diverting wall 591 intersects the fluid flow path adjacent the second end wall 574 and is positioned between the cyclone chamber 566 and a dirt collection region 562. The flow-diverting wall 591 is positioned downstream from the cyclone dirt outlet 590 and debris exiting the cyclone dirt outlet 590 impinges (i.e., impacts) the flow-diverting wall 591 while the same debris exiting the cyclone dirt outlet 590 travels over an opposite wall 592. A duct 593 is at least partially formed by the flow-diverting wall 591, the opposite wall 592, and the second end wall 574. The duct 593 is in fluid communication with the cyclone dirt outlet 590 and the dirt collection region 562. Similar to the flow-diverting wall 91 described above, the flow-diverting wall 591 eliminates a common "knife-edge" formed in prior art designs between the edge of the material throw-off in cyclone sidewalls and the adjacent dust bin. Such "knife-edge" transitions in the prior art tended to catch debris flowing toward it forming a debris clog point that reduced performance in traditional prior art cyclonic separator designs. In the illustrated embodiment, the flow-diverting wall 591 is larger in cross-sectional area than the opposite wall 592. In addition, the inner portion 575 is similar to the ramp 102 described above since the inner portion 575 includes a beginning 606 spaced from the outer portion 576 and an end 610 positioned at the outer portion 576 of the second end wall 574.

Although the separators 58, 358, and 558 described above were detailed as cyclonic, over-the-wall type separators, other alternative cyclonic and non-cyclonic separators are considered. In particular, the cyclonic separator can be, in alternative embodiments: a bag filtering unit; a conical separator; etc.

Various features and advantages of the invention are set forth in the following claims.

What is claimed is:

1. A handheld vacuum cleaner comprising:
   a fluid flow path extending from a dirty air inlet to a clean air outlet;
   a main body including a handle;
   a fluid flow motor positioned in the fluid flow path, the fluid flow motor operable to generate an airflow along the fluid flow path;
   a battery positioned below the fluid flow motor; and
   a cyclone chamber in the fluid flow path transverse to the dirty air inlet, the cyclone chamber configured to separate debris from the airflow, the cyclone chamber including
      a first end wall and a second end wall,
      a cyclone chamber axis about which the airflow and debris rotate, the cyclone chamber axis passing through the first end wall and the second end wall,
      a cyclone dirty fluid inlet, and
      a cyclone clean fluid outlet,
   wherein the first end wall and the second end wall of the cyclone chamber both intersect a common horizontal plane when the handheld vacuum cleaner is positioned on a horizontal surface.

2. The handheld vacuum cleaner of claim 1, wherein the battery is a removable and rechargeable battery pack.

3. The handheld vacuum cleaner of claim 1, wherein the battery is entirely positioned below the fluid flow motor.

4. The handheld vacuum cleaner of claim 1, wherein the handheld vacuum cleaner is supported solely by the battery when the handheld vacuum cleaner is positioned on a horizontal surface.

5. The handheld vacuum cleaner of claim 1, wherein the fluid flow motor has a fluid flow motor axis that is vertical when the handheld vacuum cleaner is positioned on a horizontal surface.

6. The handheld vacuum cleaner of claim 1, wherein the fluid flow motor axis is positioned closer to the handle than the cyclone chamber axis.

7. The handheld vacuum cleaner of claim 1, wherein the fluid flow motor axis is offset from and perpendicular to the cyclone chamber axis.

8. The handheld vacuum cleaner of claim 1, further comprising a pre-motor filter in the fluid flow path downstream from the cyclonic separator and upstream from the fluid flow motor, wherein the pre-motor filter defines a filter axis that is coaxial with the fluid flow motor axis.

9. The handheld vacuum cleaner of claim 8, wherein the pre-motor filter includes a first cylindrical filter and a second cylindrical filter, the second cylindrical filter being nested within the first cylindrical filter.

10. The handheld vacuum cleaner of claim 1, further comprising a dirt collection region with an openable bottom; wherein the fluid flow motor is positioned between the dirt collection region and the handle.

11. The handheld vacuum cleaner of claim 10, wherein the dirt collection region is at least partially defined by a bin that is removably secured to the main body.

12. The handheld vacuum cleaner of claim 11, wherein the bottom of the dirt collection region is openable when the bin is removed from the main body.

13. The handheld vacuum cleaner of claim 1, wherein the handheld vacuum cleaner is supported solely on the battery when positioned on the horizontal surface.

14. The handheld vacuum cleaner of claim 1, wherein the fluid flow motor has a fluid flow motor axis, the fluid flow motor operable to rotate a fan about the fluid flow motor axis, wherein the fluid flow motor axis extends through the battery.

15. A handheld vacuum cleaner comprising:
   a fluid flow path extending from a dirty air inlet to a clean air outlet;
   a main body including a handle;
   a fluid flow motor positioned in the fluid flow path, the fluid flow motor operable to generate an airflow along the fluid flow path; wherein the fluid flow motor has a fluid flow motor axis that is vertical when the handheld vacuum cleaner is positioned on a horizontal surface;
   a cyclone chamber in the fluid flow path, the cyclonic chamber configured to separate debris from the airflow, the cyclone chamber including
      a first end wall and a second end wall,
      a cyclone chamber axis about which the airflow and debris rotate, the cyclone chamber axis passing through the first end wall and the second end wall,
      a cyclone dirty fluid inlet, and
      a cyclone clean fluid outlet, wherein the first end wall and the second end wall of the cyclone chamber both intersect a common horizontal plane when the handheld vacuum cleaner is positioned on the horizontal surface.

16. The handheld vacuum cleaner of claim 15, wherein the fluid flow motor axis is positioned closer to the handle than the cyclone chamber axis.

17. The handheld vacuum cleaner of claim 15, wherein the fluid flow motor axis is offset from and perpendicular to the cyclone chamber axis.

18. The handheld vacuum cleaner of claim 15, further comprising a pre-motor filter in the fluid flow path downstream from the cyclonic separator and upstream from the fluid flow motor, wherein the pre-motor filter defines a filter axis that is coaxial with the fluid flow motor axis.

19. The handheld vacuum cleaner of claim 18, wherein the pre-motor filter includes a first cylindrical filter and a second cylindrical filter, the second cylindrical filter being nested within the first cylindrical filter.

20. The handheld vacuum cleaner of claim 15, further comprising a dirt collection region with an openable bottom; wherein the fluid flow motor is positioned between the dirt collection region and the handle.

21. The handheld vacuum cleaner of claim 20, wherein the dirt collection region is at least partially defined by a bin that is removably secured to the main body.

22. The handheld vacuum cleaner of claim 21, wherein the bottom of the dirt collection region is openable when the bin is removed from the main body.

23. The handheld vacuum cleaner of claim 20, further comprising a battery positioned below the fluid flow motor, wherein a bottom surface of the battery is below the openable bottom of the dirt collection region.

24. The handheld vacuum cleaner of claim 23, wherein the fluid flow motor has a fluid flow motor axis, the fluid flow motor operable to rotate a fan about the fluid flow motor axis, wherein the fluid flow motor axis extends through the battery.

25. The handheld vacuum cleaner of claim 15, wherein the handheld vacuum cleaner is supported solely on the battery when positioned on the horizontal surface.

26. A handheld vacuum cleaner comprising:
a fluid flow path extending from a dirty air inlet to a clean air outlet, the fluid flow motor operable to generate an airflow along the fluid flow path;
a main body including a handle;
a fluid flow motor positioned in the fluid flow path;
a dirt collection region with an openable bottom; wherein the fluid flow motor is positioned between the dirt collection region and the handle; and
a cyclone chamber in the fluid flow path, the cyclone chamber configured to separate debris from the airflow, the cyclone chamber including
a first end wall and a second end wall,
a cyclone chamber axis about which the airflow and debris rotate, the cyclone chamber axis passing through the first end wall and the second end wall,
a cyclone dirty fluid inlet, and
a cyclone clean fluid outlet,
wherein the first end wall and the second end wall of the cyclone chamber both intersect a common horizontal plane when the handheld vacuum cleaner is positioned on a horizontal surface;
a battery positioned below the fluid flow motor, wherein a bottom surface of the battery is below the openable bottom of the dirt collection region; and
wherein the fluid flow motor has a fluid flow motor axis, the fluid flow motor operable to rotate a fan about the fluid flow motor axis, wherein the fluid flow motor axis extends through the battery.

27. The handheld vacuum cleaner of claim 26, wherein the dirt collection region is at least partially defined by a bin that is removably secured to the main body.

28. The handheld vacuum cleaner of claim 27, wherein the bottom of the dirt collection region is openable when the bin is removed from the main body.

* * * * *